United States Patent

Angner et al.

[15] 3,691,308

[45] Sept. 12, 1972

[54] MULTILINE SELECTIVE SIGNALING SYSTEM

[72] Inventors: Ronald Joseph Angner, Freehold; Anthony Koscinski, Brick Town, both of N.J.

[73] Assignee: Bell Telephone Laboratories, Incorporated, Murray Hill, Berkeley Heights, N.J.

[22] Filed: Nov. 27, 1970

[21] Appl. No.: 93,158

[52] U.S. Cl...........179/18 BH, 179/17 B, 179/18 AF, 179/84 SS

[51] Int. Cl.........................H04m 1/70, H04m 13/00

[58] Field of Search..179/18 BH, 18 D, 18 DA, 18 BC, 179/18 AF, 84 SS, 17 B, 17 R

[56] References Cited

UNITED STATES PATENTS 3,508,007 4/1970 Goodall et al. ....179/18 BC X 3,036,163 5/1962 Bachelet................179/84 SS

*Primary Examiner*—William C. Cooper
*Assistant Examiner*—Thomas W. Brown
*Attorney*—R. J. Guenther and James Warren Falk

[57] ABSTRACT

A multiline selective signaling system is arranged to generate privacy lockout tones when a first station on any line goes off-hook. The first such station off-hook is designated a controlling station and circuitry at each station or common to a group of stations responds to the lockout tones by removing signaling and communicating capability from all but the controlling station. On interline calls single station control of the system is maintained by an interline control circuit which is arranged to inhibit the first station going off-hook in a called line from also becoming a controlling station. On interline override calls dialing capability is removed from the interference with previously established called line connections.

18 Claims, 16 Drawing Figures

INVENTORS R. J. ANGNER
A. KOSCINSKI
BY David W. Tannenbaum
ATTORNEY

FIG. 16

| CASE | CONDITION: LINE | CALLS LINE | BRIDGE BUSY | BRIDGE SEL. | BRIDGE CONN RELAYS OPR. | FLAG ON LINE | DISABLE TONE FROM : TO | DISCONNECT TONE FROM : TO | ACTION TAKEN IN RESPONSE TO: FIRST PRIVACY OVERRIDE TONE | ACTION TAKEN IN RESPONSE TO: SECOND PRIVACY OVERIDE TONE |
|---|---|---|---|---|---|---|---|---|---|---|
| 1 | L1 | L5 | NONE | A | 9CA1, 10CA5 | — | A : L5 | L1 : L1, L5 | — | — |
| 2 | L1 | L5 | A | B | 9CB1, 10CB5 | — | B : L5 | L1 : L1, L5 | — | — |
| 3 | L1 | L2 | NONE | A | 9CA1, 10CA2 | — | A : L2 | L1 : L1, L2 | — | — |
| | L5 | L4 | A | B | 10CB5, 10CB4 | — | B : L4 | L5 : L5, L4 | — | — |
| | L5 | L1 | A,B | – | 9CB1 | L1 | NOT SENT | NOT SENT | OPR 9CB1 | RLS 9CB1 |
| 4 | L1 | L5 | NONE | A | 9CA1, 10CA5 | L1 & L5 | NOT SENT | L1 : L1 | OPR 9CA1, 10CA5 | RLS 9CA1, 10CA5 |
| | LINE L5 BUSY | | | | | L5 | | | | |
| 5 | L1 | L2 | A | B | 9CB1, 10CB2 | | B : L2 | L1 : L1, L2 | — | — |
| | L5 | L1 | A,B | – | 10CB5 | L5 | NOT SENT | L5 : L5 | OPR 10CB5 | RLS 10CB5 |
| 6 | L5 | L4 | NONE | A | 10CA5, 10CA4 | — | A : L4 | L5 : L5, L4 | OPR 9CB1 | RLS 9CB1 |
| | L1 CALLS | L5 | A | A | 10CA1 | L1 | NOT SENT | L1 : L1 | | |
| | L2 | L3 | — | A | 10CA2, 10CA3 | — | A : L3 | L2 : L2, L3 | — | — |
| 7 | L1 BUSY | | A | – | — | — | — | L1 : L1 | | |
| | L5 | L1 | A | B | — | L1 & L5 | NOT SENT | L5 : L5 | OPR 9CB1, 10CB5 | RLS 9CB1, 10CB5 |

MULTILINE SELECTIVE SIGNALING SYSTEM

BACKGROUND OF THE DISCLOSURE

This invention relates to private multiline right-of-way signaling systems and more particularly to an arrangement for providing independent communication capability between selected stations on each line while at the same time maintaining the system viable for the establishment of communication connections between selected stations served by different lines.

DESCRIPTION OF THE PRIOR ART

The arrangement of a private transmission line between a number of separate locations with many stations at each location having access to the line is a well-known method for providing instant communication between specific points. Such an arrangement is especially important for executives or government officials, such as mayors or governors, who must have immediate access to a number of stations. Selective signaling systems also find wide usage in right-of-way communication situations where dispatchers, such as railroad dispatchers, must communicate with certain stations or with groups of stations at different points along a pipeline or railroad main line.

In typical situations there exists a community of interest between certain groups of stations. For example, in railroad dispatch systems communication between stations along any given right-of-way is more frequent than communication between stations along separate railroad lines. Since it is imperative in such a system that communication along any line be independent of communication along any other line, the system must be designed so that stations on any line may communicate with each other without regard to the busy-idle status of stations on any other line. However, it is also important and in some situations vitally imperative that communication capability is extendable between stations along separate lines.

In our copending application, Ser. No. 78,053, filed Oct. 5, 1970, now U.S. Pat. No. 3,651,274, there is disclosed a single line multilocation selective signaling system wherein the first station going off-hook transmits a privacy lockout tone throughout the system. The first such station off-hook is designated a controlling or originating station and circuitry at each location responds to the lockout tones by removing signaling and communicating capability from all but the controlling station. When the controlling station returns on-hook at the completion of a call a special disconnect tone is transmitted throughout the system thereby releasing the system so that the next off-hook station becomes an originating station.

When a number of such systems are connected together to form a multiline system numerous problems exist when a call is to be established between stations served by separate lines. These problems are concerned primarily with the generation of the automatic lockout and automatic disconnect signals. For example, assume that a station on a first line calls a station on a second line. In such a situation when the calling station goes off-hook originating tone is sent out only on the first line so that the calling station on the first line becomes an originating station. Since the second line is essentially independent from the first line the originating tone is not transmitted to the second line. Accordingly, a station in the second line going off-hook in response to the interline call is actually the first station off-hook in that line and thus also becomes an originating station.

In addition to the complications inherent when two stations on separate lines each receive dialing capability further problems arise when the stations return to the on-hook condition. If the first line originating station had been previously involved in a conference connection on that line the second line called station going on-hook (assuming that station had been designated an originating station) would send disconnect signals to the first line and thus would release all of the stations on the first line even though the originating station on the first line is still involved in a conference thereon.

The problem is further compounded in that when the second line is busy, override capability is desirable. In such a situation provision must be made so that the dialing capability of the calling line originating station is not extended to the called line. This is necessary to prevent the calling station from adding a station to the previously established conference in the called line against the wishes or without the knowledge of the originator of the conference in the called line.

Accordingly, a need exists in the art for a multiline selective signaling system capable of maintaining communications between stations on each line independent from communications between stations on any other line while at the same time maintaining the system viable for the selective establishment of communication connections between stations on separate lines.

A further need exists in the art for a multiline selective signaling system whereby an originating station on any line may call any number of stations on any number of lines while maintaining exclusive system control and wherein on interline override calls a previously designated originating station on the called line is given exclusive system control and wherein upon termination of any interline call only the interline connection is automatically disconnected and the system restored to its condition just prior to the establishment of the interline call.

SUMMARY OF THE INVENTION

These and other objectives are obtained in accordance with one exemplary embodiment of the invention wherein the four-wire private line facility from a number of separate single line selective signaling systems is extended to a control circuit arranged to selectively interconnect a calling station on any line with called stations on any other line. Each of the stations on each line is selectively accessible from any other station on the same line by the transmission of a three-digit code number from the calling station. The transmitted digits are decoded by common receiver and decoding circuitry at each location and the station or stations corresponding to the transmitted code are activated.

Each of the single line signaling systems is arranged such that when a first station thereon goes off-hook a privacy lockout tone is transmitted throughout that system. The first such station off-hook in each line is designated a controlling or originating station and circuitry at each location on that line responds to the lockout tones by removing signaling and communicating capability from all but the controlling station. Communication capability is extended only to those stations in the line dialed by the controlling station and busy tone is returned to any off-hook station in that line which has not been given such capability. Signaling between the stations is discreet in that subscribers at stations which have not been signaled are not made aware that there is a call currently in progress.

When an interline call is to be made the subscriber at the calling stations transmits a special three-digit code followed by the three-digit code corresponding to the called station.

The interline control circuit is activated upon detection of the special code and if the called line is idle connects the transmission path of the calling line to one port of a four-wire bridge and connects the transmission path of the called line to another port of the bridge so that the subsequently transmitted three-digit code corresponding to the called station is transmitted over the called line as well as over the calling line. When the called line is detected idle privacy lockout tone (originator disable tone) is transmitted from the interline control circuit over the called line so that the called station, upon going off-hook in response to an interline call, will not become an originating station even though that station is the first station off-hook in the called line.

Upon termination of this connection the interline control circuit maintains the connection between the lines for a certain period so that disconnect tone, which is transmitted over the calling line under control of the originating station when that station subsequently goes on-hook, is also transmitted over the called line so as to restore the called line to its condition just prior to the interline call.

In a situation where a connection is directed to a busy line the interline control circuit causes busy tone to be returned over the calling line to the calling station. The calling station may then override the busy signal by enabling an override key. Operation of the override key, as detailed in our above-mentioned copending application, causes the dialing capability of the calling station on the calling line to be disconnected and also causes a special tone to be sent over the transmission line. The interline control circuit upon detecting the special override tone connects the transmission path of the calling line to the transmission path of the called line via individual ports of the bridge so that the overriding subscriber on the calling line may communicate with all parties on the previously established connection on the called line. A low level tone is applied to the line during all override calls to alert everyone to the intrusion of privacy.

Upon release of the override key by the overriding subscriber the special override tone is again sent over the transmission line. Upon receipt of this second burst of tone, the overriding line is separated from the bridge and the subdued tone is removed. Accordingly, the previously established connection on the called line is continued under exclusive control of the previously designated originating station on that line while the overriding calling line is returned to its condition just prior to the interline call.

DESCRIPTION OF THE DRAWING

The foregoing objects, features and advantages, as well as others of the invention, will be more apparent from the following description of the drawing, in which:

FIG. 16 is a chart illustrating several possible interline connection configurations.

Figure 1:
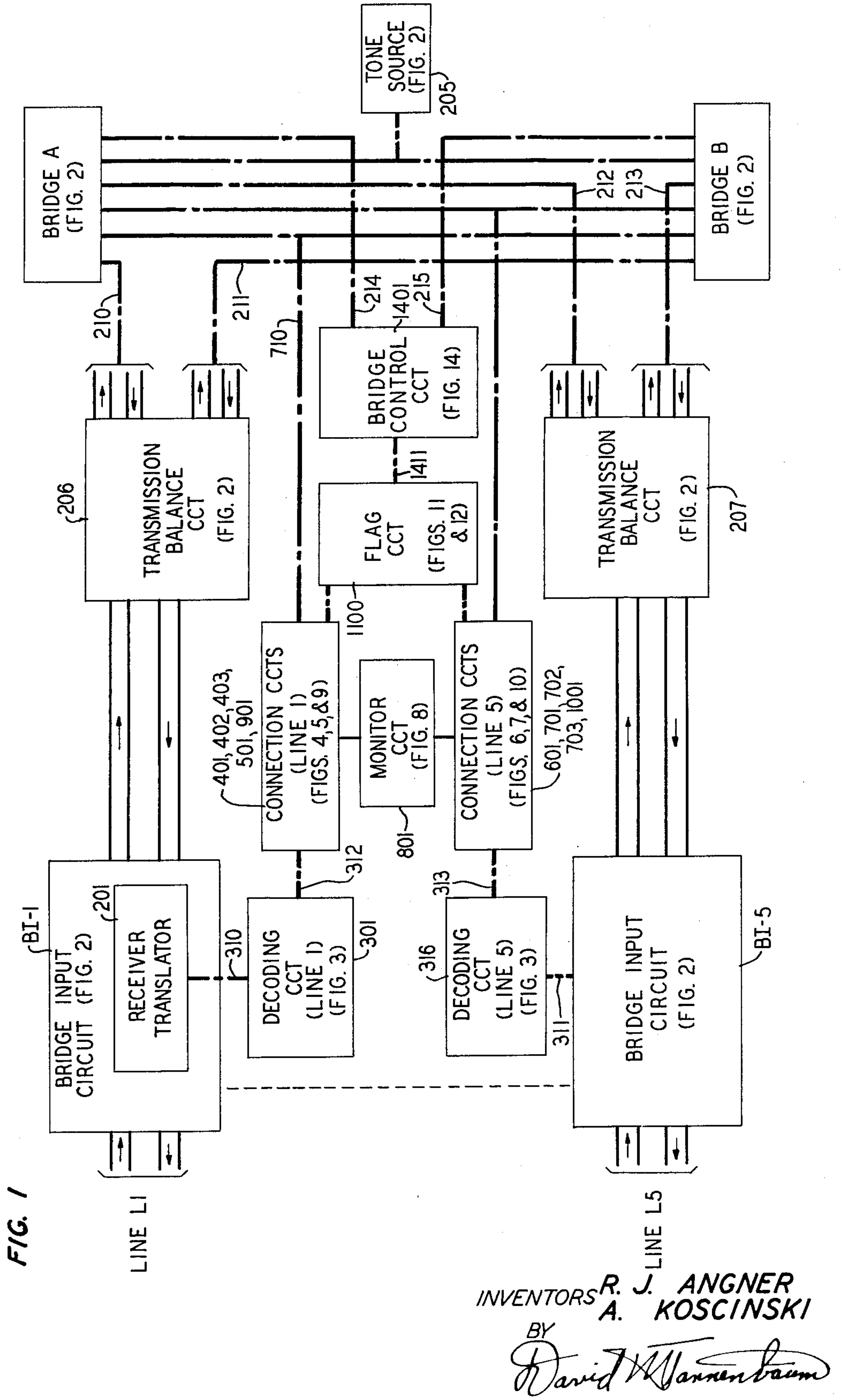
FIG. 1 is essentially a block diagram of one exemplary embodiment of the invention.

It will be noted that FIGS. 2 through 14 employ a type of notation referred to as "detached contact" in which an "X" shown intersecting a conductor represents a normally open contact of a relay and a bar shown intersecting a conductor at right angles represents a normally closed contact of a relay, "normally" referring to the unoperated condition of the relay. The principles of this type of notation are described in an article entitled "An Improved Detached Contact Type Schematic Circuit Drawing" by F. T. Meyer in the Sept. 1955 publication, *Transactions of The American Institute of the Electrical Engineers, Part* 1, *Communications and Electronics*, Vol. 74, pages 505–513.

It will be noted also that in order to simplify the disclosure and thus facilitate a more complete understanding of the embodiment, the relays, relay contacts and other electromechanical devices shown in FIGS. 2 through 14 have been given systematic designations. Thus, the number preceding the letters of each device correspond to the figure in which the control circuit of the device is shown. Thus, the coil of relay 9CA1 is shown in FIG. 9. Each relay contact, either make, break or transfer, is shown with its specific contact number preceded by the designation of the relay to which it belongs. For example, the notation 9CA1–3 indicates contact number 3 of relay 9CA1 the coil of which is shown in FIG. 9.

In order to further facilitate an understanding of the invention the description of the operation of the exemplary embodiment has been subdivided into a general description portion designated 1.00 and a detailed description designated 2.00. Section 1.00 describes the invention in general terms with respect to FIG. 1 and Section 2.00 and its subsections describe the invention in detail with respect to FIGS. 2 through 16.

100 GENERAL DESCRIPTION

Prior to beginning a discussion of the specific embodiment of this invention it may be helpful to review some of the fundamental aspects of private line selective signaling systems. Primarily, such systems may be characterized as huge party lines where a subscriber at any one of a number of stations, simply by removing the headset at that station, may talk with the party at any one of the other stations. In order that a calling party may communicate with a party at a certain selected station such systems are arranged with signaling capability of a selective nature. Thus, although the stations all share a common communication path, each station is assigned a specific code for signaling purposes.

In a particular embodiment of such a system, as detailed in our copending application referred to above, each station is assigned any number of three-digit codes and will respond to the reception of any of these codes. In addition, a number of stations may be assigned the same code and each will respond to the reception of that code. The group code in any station may be the only code assigned to that station in which case that particular station will only ring when the group code is transmitted from the calling station or the group code assigned to the station may be a second code or one of many codes assigned to that station in which case the station will ring when any of the assigned codes are transmitted from a calling station.

Since each line of the multiline selective signaling system is maintained in an independent condition, codes transmitted from any station will be received only by stations connected to the same line. Thus, when it is desired to establish an interline connection, a special code, as discussed previously, must be transmitted prior to the transmission of the three-digit code corresponding to the called station.

In the embodiment each of the four-wire communicating paths from separate single line selective signaling systems is brought into one physical location for interconnection purposes.

Turning now to FIG. 1, the four-wire transmission facility from each line, such as the four-wire path from line L1, is extended to a bridge input circuit, such as bridge input circuit BI–1. Associated with each bridge input circuit is a receiver translator circuit, such as receiver translator 201, and a decoding circuit, such as decoding circuit 301. Upon translation of the special line interconnection code the decoding circuit in conjunction with connection circuits, such as connection circuits 401, 402, 403, 501, and 901, establishes a communication path from the calling line to one port of an idle multiport bridge, such as bridge A. The four-wire transmission facility associated with the called station is connected to another port of the same bridge so that transmission over either line is received by the other line. Two bridges are provided so that independent connections between lines may be established.

Flag circuit 1100 is arranged to operate in conjunction with the connection circuits associated with each line in such a manner that a record is maintained at all times of which lines are connected to which bridge in an override mode so that the lines may be disconnected in the proper sequence in order to ensure that all lines are returned to their preoverride condition. A monitor circuit, such as monitor circuit 801, operates in conjunction with the connection circuits and with the flag circuit 1100 to control the disconnection of the lines from each other at the appropriate time.

Numerous situations exist when the system is in the interline overriding mode in which mode special care must be exercised in order to ensure that the system is returned to the preinterline condition. Thus, in the situation where lines L1 and L2 are connected together on bridge A and line L5 desires to communicate with line L1, line L5 is connected to bridge A. the flag circuit marks the calling line L5 as the overriding line. At the termination of the interline call when the subscriber on line L5 releases the override key and/or returns on-hook the bridge connection between line L5 and the bridge is separated either when the second override tone is received (this tone is sent out when the override key is released) or before the length of automatic disconnect tone required to disconnect the stations on lines L1 and L2 is received by lines L1 and L2. This is necessary in order to ensure that the interline connection between lines L1 and L2 remains intact when line L5 is removed from the connection.

In the situation where two lines are connected together on a bridge and two other lines are connected together on the other bridge, and one of the lines desires a connection to a line associated with the other bridge, the connection circuit operates to connect the called line to the calling line bridge. The flag circuit is arranged to mark the called line even though that line is associated with a bridge. Upon disconnection, the two bridges are separated under control of the flag circuit and disconnect tone is not transmitted on any line unless one of the originators has gone on-hook.

Other situations exist in which the called line, as opposed to the calling line, is marked by the flag circuitry. For example, when the called line is a line which is busy but which is not connected to a bridge and is called from a line either on or off of a bridge the called line is marked. The marking of the called line in this situation is important because at the termination of the connection, the called line must be removed from the bridge prior to the transmission of the length of automatic disconnect tone necessary to disconnect the stations on the called line.

2.00 DETAILED DESCRIPTION

The following text will describe the embodiment of the invention in detail with reference to FIGS. 2 through 14, and FIG. 16.

Figure 5:
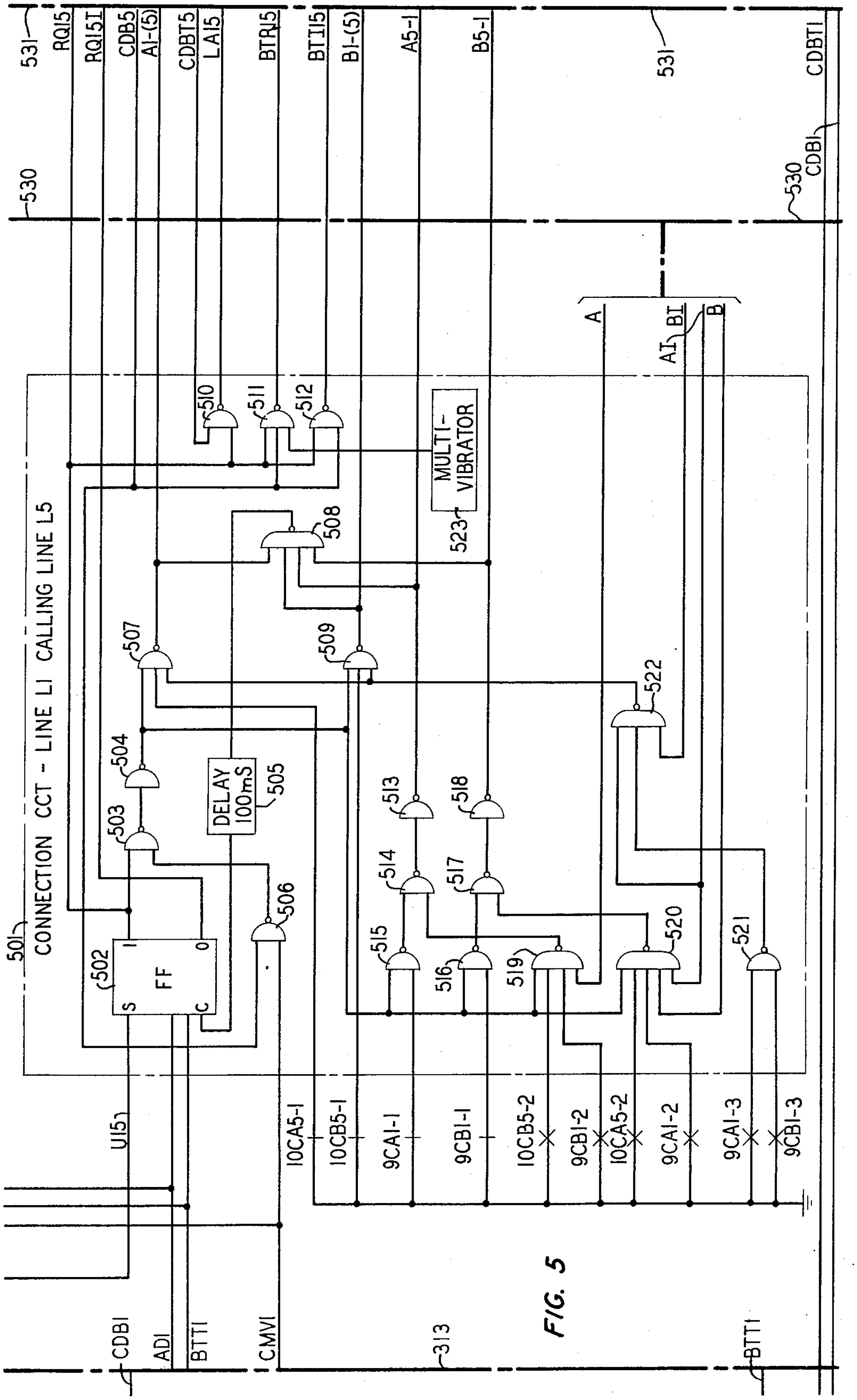

It should be noted that each electronic gate, such as gate 503, FIG. 5, is arranged in any one of the well-known circuit configurations such that when a battery potential (high) is present on all inputs, the gate will be turned on and the output of the gate will be ground (low). If any input is low, the gate will be turned off and the output will be high. Such a gate is known as a NAND gate. Unused inputs of all such gates will be assumed to be high. Gates having single inputs are used to perform a simple inversion thereby providing the inverse of the signal applied to the input. It should also be noted that in actual practice NAND gates, flip-flops, and many other electronic circuits are not designed to drive directly electromechanical devices or large numbers of gates. Therefore, it is customary for a circuit designer to choose the opposite output (such as "0" instead of "1" of a flip-flop) from the one desired and to use a power inverter gate to drive the necessary circuits. For purposes of clarity herein many of the inverter gates have been omitted and the flip-flops or other circuit elements have been shown to drive the output device directly. Those skilled in the art will not have difficulty selecting the proper components to perform the described function.

For purposes of discussion, let us assume that a station in line L1 desires to call a station in line L5. We shall also assume that at this time line L5 is idle and therefore available for interline connection. This situation is case 1 of FIG. 16.

Accordingly, as discussed previously, the calling station in line L1 goes off-hook and key pulses the three-digit code ( # 15) associated with the desired line. It should be noted that it is assumed that the calling subscriber is equipped with a 12-key telephone instrument, each key producing a unique combination of two frequencies when operated. The first 10 keys of such an instrument correspond to the digits 0–9 and one of the other keys corresponds to the digit # . The first transmitted digit # is the interline control digit and is followed by digits corresponding to the calling and called lines. It is to be understood that such a code has been selected for convenience and that the interline three-digit code could be any combination of digits desired.

Figure 2:
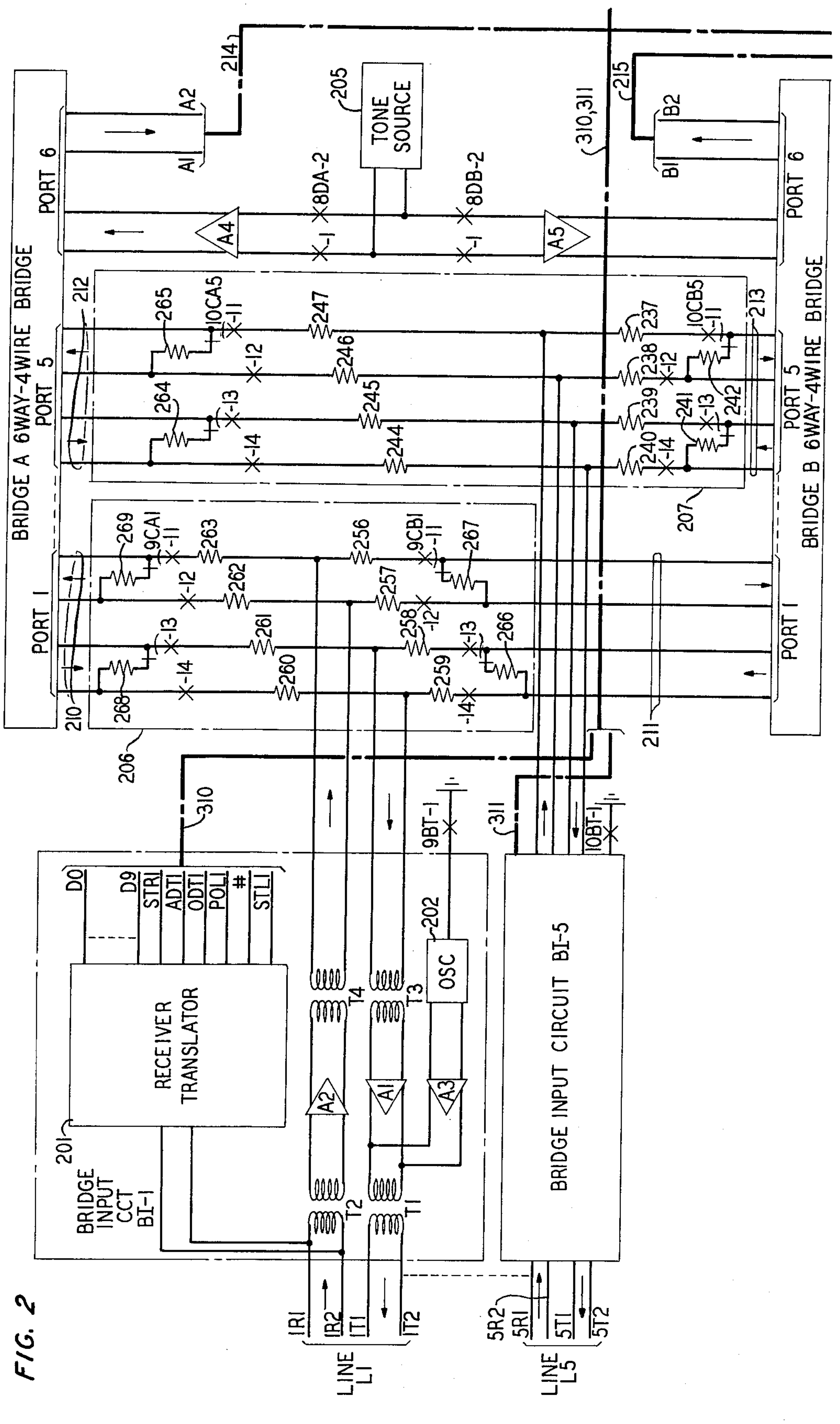
FIGS. 2 through 14 are schematic drawings showing in greater detail the interrelation of the components of the exemplary embodiment.

Turning now to FIG. 2, the transmitted three-digit code is received on the receive leads IR1 and IR2 of line L1 by receiver translator 201, which translator is arranged in any one of the well-known circuit configurations operable to translate frequency tones into ground potentials on corresponding output leads. The translator is also operable to provide a ground on lead STR1 at the beginning of the signal transmission period. Accordingly, upon receipt of the first digit of the three-digit code, grounds are present upon the STR1 and # output leads of receiver translator 201 which grounds are extended via cable 310 to the decoding circuit 301 of FIG. 3.

The ground or low on lead STR1 is extended to digit counter and interdigital timer 302 which circuit is arranged in any one of the well-known circuit configurations operable to count the pulses provided on the input lead so as to remove a low from an output lead at the beginning of a first pulse and to reapply the low at the termination of a third pulse. Accordingly, upon lead STR1 going low, ground is removed from the clear leads of each of the flip-flops of line L1 decoding circuit 301. The flip-flop circuits of each counter are arranged such that only when a certain flip-flop has been operated prior to application of a low on a certain cross-wired input from the translator circuit will an output on any of the leads U12 through U15 be present.

For example, in order to provide a low on lead U15, the flip-flop in units counter 315 must set. Since units counter 315 is prearranged for code # 15 its clear lead will only be released if the two digits received prior to the third digit are # and 1 and are received in that order. This is accomplished by connecting the clear lead of units counter 315 to the "1" output of flip-flop 305 in tens counter 306. Since tens counter 306 is set for code # 1, its clear lead will only be released if the digit received prior to the second digit is # . This is accomplished by connecting the clear lead of tens counter flip-flop 305 to the "1" output lead of hundreds counter flip-flop 304. Thus, only if the three digits # 15 are received in the order " # ", "1", and "5" will the flip-flop in units counter 315 be set. The respective inputs to each circuit are cross-connected to the digit ground representing the digit for which that counter will respond. Thus, lead # is cross-connected to lead HD1 of hundreds counter 303 which counter will respond to a first transmitted digit # .

Since it has been assumed that the three-digit code # 15 has been received on line L1, a low appears on lead U15 which low is extended via cable 312 to FIG. 5 to set flip-flop 502 in line L1 calling line L5 connection circuit 501. At this point the decoding circuit 301 under control of digit counter and interdigital timer 302 releases in preparation for receipt of any future transmitted digits.

Continuing now in FIG. 5, the setting of flip-flop 502 provides a high on one of the input leads to gate 503. The other input lead is also high at this point because of the low present on one of the input leads of gate 506 via ground on lead CDB5 from line L5 connection circuit, FIG. 10. Lead CDB5 is low at this point due to the double inversion from the now low "1" output of the 1008 flip-flop, which flip-flop is reset at this point because of the assumed idle status of line L5.

Returning to FIG. 5, since both inputs of gate 503 are high its output goes low and thus the output of gate 504 now goes high. The output of gate 507 is maintained high at this point via ground from released break contact 10CA5–1. The high from the output of gate 504 is applied to the inputs of gates 509, 515, 516, 519, and 520 which gates are arranged to select the proper bridge for subsequent connection thereto. The outputs of gates 509, 515, and 516 remain high because of the respective lows provided by released break contacts 10CB5–1, 9CA1–1, 9CB1–1. Since make contacts 10CB5–2, 9CB1–2, 10CA5–2, 9CA1–2 are normal at this point because of the assumed idle condition of lines L1 and L5 gates 519 and 520 are now under control of leads A, AI, and B.

Figure 8:
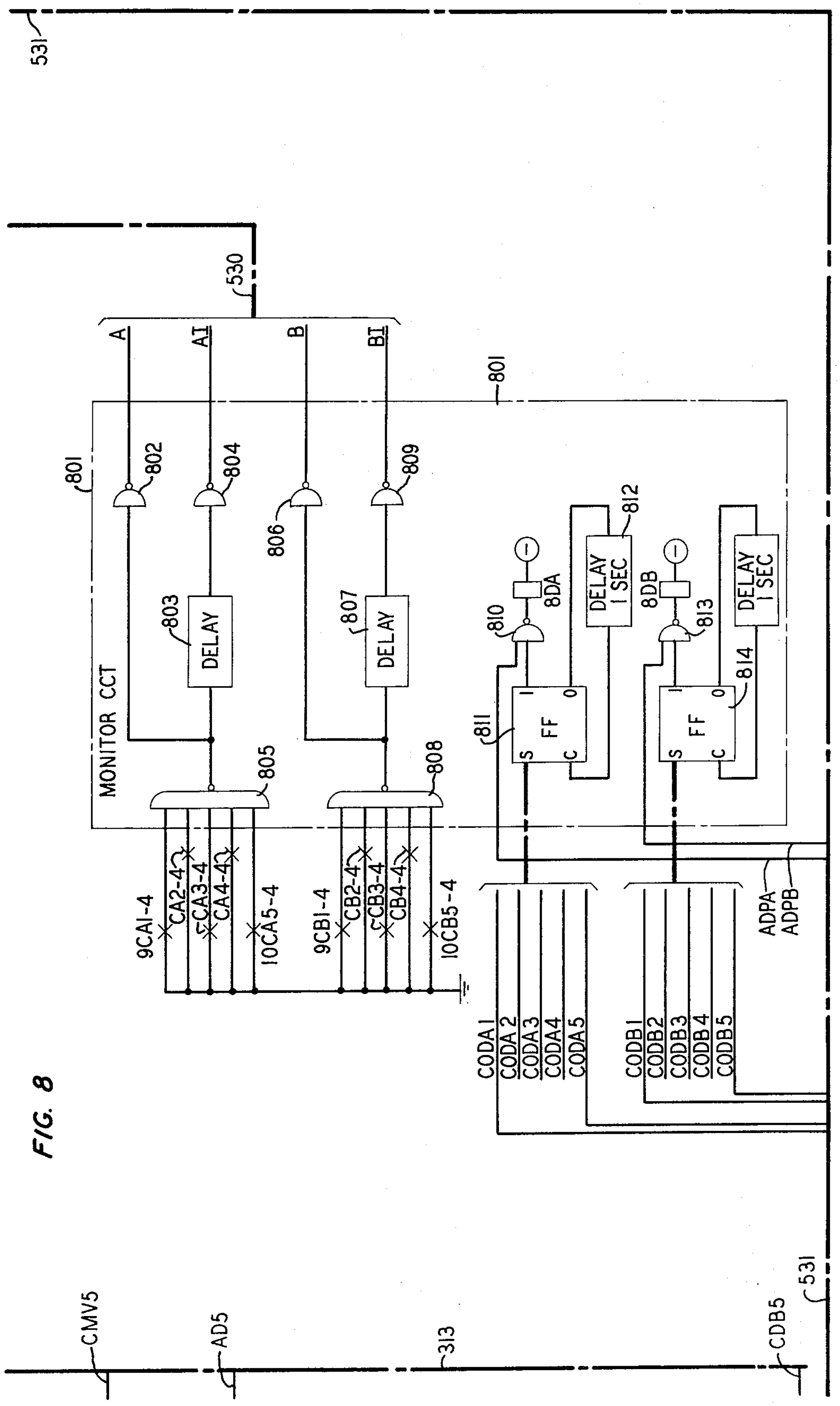
Figure 9:
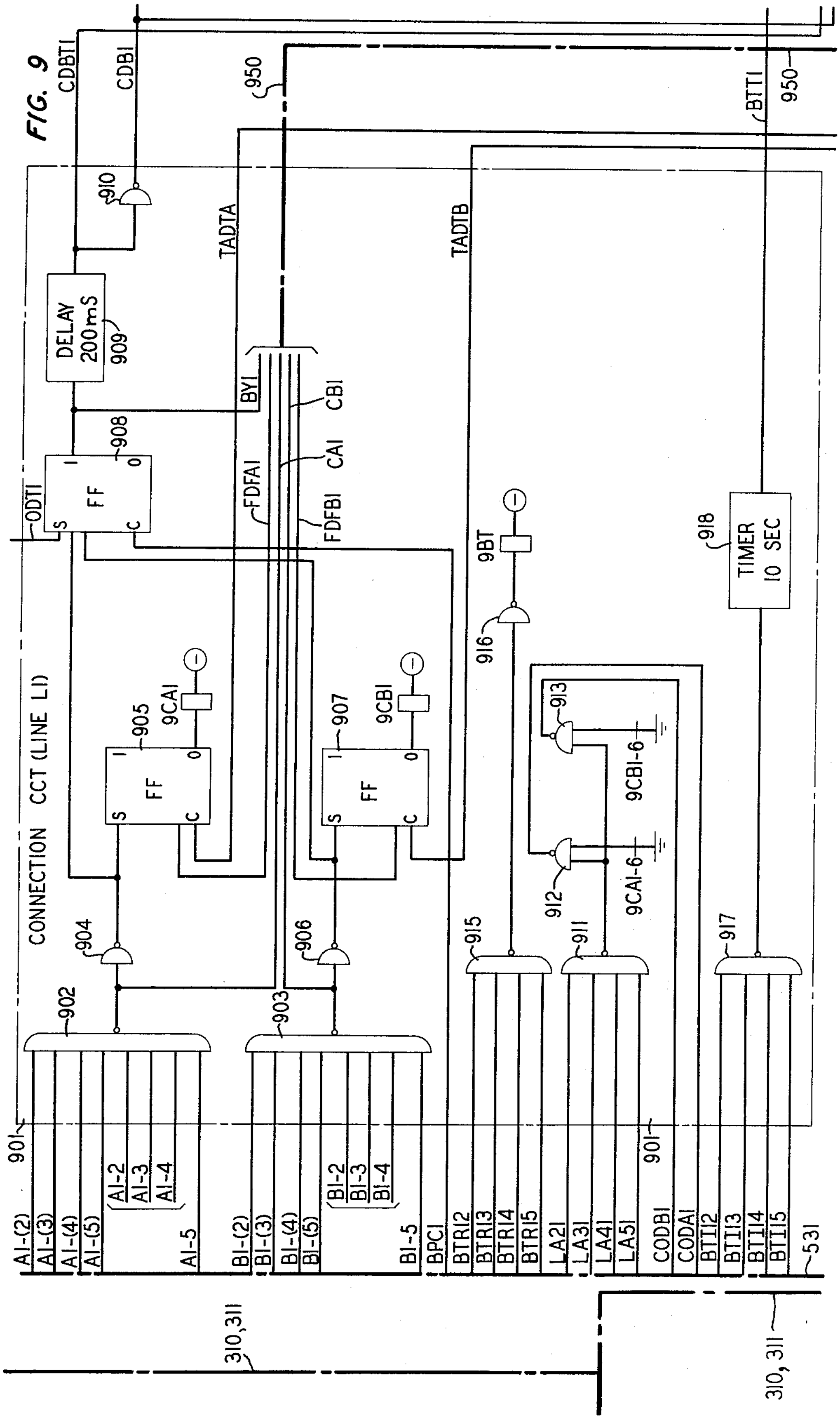

Turning now to FIG. 8, since neither bridge A nor bridge B is busy at this point the corresponding bridge control relays are not operated. Therefore, all inputs to gates 805 and 808 are high. Thus the outputs from gates 805 and 808 are each low, which lows are inverted by gates 802 and 806. Accordingly, leads A and B of cable 530 are now each high. It will be noted that leads AI and BI are the inverse of leads A and B and are controlled by delay circuits 803 and 807 in conjunction with gates 804 and 809. Thus, leads AI and BI are low at this time.

Returning to FIG. 5, the low on lead AI, from cable 530 maintains the output of gates 520 and 522 high. The high on lead A is applied to the input of gate 519 and since all of the input leads to gate 519 are now high the output goes low thereby changing the output of gate 514 from low to high and the output from gate 513 from high to low. The low from gate 513 changes the output of gate 508 from a low to a high. This, in conjunction with delay circuit 505, will reset flip-flop 502 after 100 milliseconds. This delay ensures that all bridge control relays have sufficient time to operate. Also, the low from gate 513 is extended via lead A5–1 and cable 531 to FIG. 10 thereby causing the output of gate 1002 in line L5 connecting circuit 1001 to go high. The output of gate 1004 thereupon goes low and sets flip-flop 1005. Flip-flop 1005 setting operates relay 10CA5 which is the line L5 connecting relay for bridge A. Flip-flop 1008 is also set at this point signifying that line L5 is now busy.

Summarizing briefly, upon detection of an interline calling code two basic determinations have been made. First, the calling line control circuit has determined the busy-idle status of the called line. This was accomplished by arranging the calling line control circuit with access to a flip-flop of the called line which flip-flop monitors the busy-idle status of the called line. Second, a determination was made as to the busy-idle status of the two bridges. This determination was accomplished by arranging the calling line control circuit to interrogate all of the bridge control relays for both bridges via a common monitoring circuit. Under control of the monitoring circuit, the connection was completed to the first idle bridge, bridge A.

Returning now to FIG. 5, the enabling of the bridge connecting relay 10CA5 removes the ground via now enabled break contact 10CA5–1 from one of the input leads of gate 507. Since all of the input leads of gate 507 are now high, a low is transmitted via lead A1–(5) to FIG. 9 causing the output of gate 902 to go high thereby setting flip-flops 905 and 908. Flip-flop 908 is the busy flip-flop for line L1 and flip-flop 905 operates line L1 bridge A connecting relay 9CA1 to connect line L1 to bridge A in a manner now to be detailed.

As shown in FIG. 2, each bridge input circuit, such as bridge input circuit BI–1, is connected to a respective one of the ports of one of the six-port four-wire bridge circuits. The operating principles of such bridges have become well known and need not be detailed herein. The actual connection to a port of the bridge is via the contacts of the respective bridge connecting relays, such as contacts 9CA1–11, 9CA1–12, 9CA1–13, and 9CA1–14 of relay 9CA1. Connection of line L1 to port 1 of bridge A therefore is accomplished by relay 9CA1 while relay 9CB1 connects line L1 to port 1 of bridge B. As will be seen in detail hereinafter, each line may be connected simultaneously to both bridges. For example, operation of bridge connect relays 10CA5 and 10CB5 will connect line L5 to port 5 of each of the bridges.

The sixth port of each bridge is used for control purposes and is thus not assigned to a line. The receive pair of leads associated with port 6 of each bridge, such as leads A1, A2, B1 and B2, are used for receiving special signals transmitted over any line connected to the bridge. The transmit pair of leads of port 6 of each bridge is used to transmit special control signals over any line connected to the bridge. The precise manner in which these control tones are received and transmitted will be detailed hereinafter.

In the example illustrated where line L1 calls idle line L5 care must be taken to insure that the first station off-hook in response to the call does not become an originating station. This is accomplished by transmitting originator disable tone over line L5 prior to transmitting the three-digit code from the calling line corresponding to the called station. This tone is transmitted in response to the connection of line L5 to the bridge in the following manner.

Figure 10:
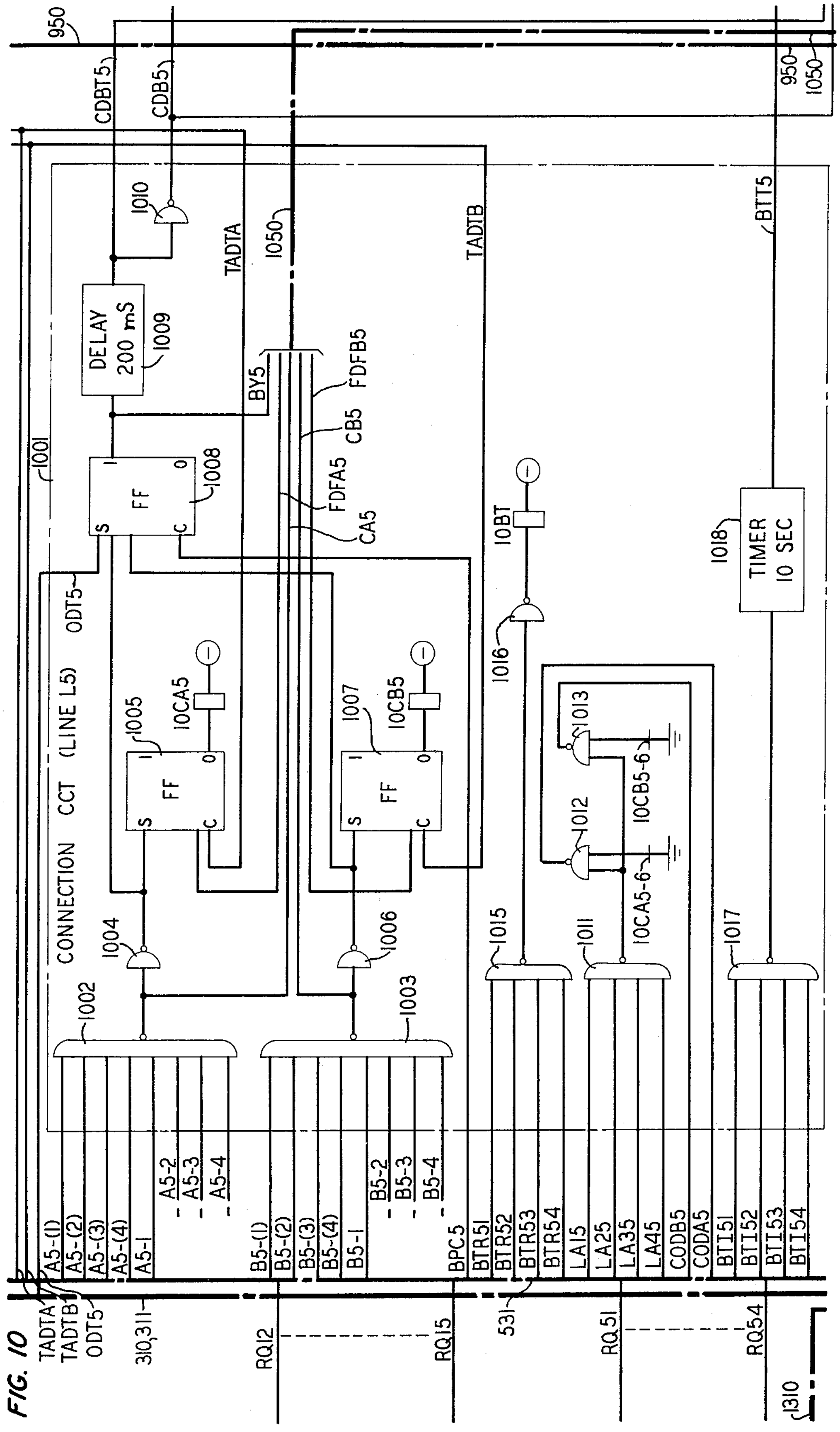

Turning to FIG. 10, it will be recalled that flip-flop 1008, which flip-flop monitors the busy-idle status of the called line L5, was reset prior to the initiation of the illustrated connection. Thus, lead CDBT5 from 200 millisecond delay timer 1009 is high when flip-flop 502 in line L1 calling line L5 connection circuit, FIG. 5, is set. Accordingly, as shown in FIG. 5, both inputs of gate 510 are high when the 502 flip-flop is set and thus lead LA15 of cable 531 goes low. This low on lead LA15 is extended to FIG. 10 via cable 531 to gate 1011, the output of which gate then goes high. When line L5 bridge connecting relay 10CA5 operates, as discussed above, ground is removed from one input lead to gate 1012 via enabled make contact 10CA5–6. Thus the output of gate 1012 goes low and will remain low for the duration of the 200-millisecond delay as controlled by delay timer 1009. Thus a short pulse is generated at this time. This pulse is extended via lead CODA5 and cable 531 to FIG. 8 thereby setting flip-flop 811 in monitor circuit 801. When flip-flop 811 becomes set a high is extended to one input of gate 810. The other input of gate 810 is via lead ADPA and cable 531 which lead is also high at this time. This follows since lead ADPA is extended from the bridge control circuit shown in FIG. 14. Lead ADPA is high because of the reset status of flip-flop 1402.

Continuing in FIG. 8, when flip-flop 811 sets, relay 8DA operates for a fixed period as controlled by delay timer 812. At the end of the period, which in this case is one second, relay 8DA releases.

Turning now to FIG. 2, the enabling of relay 8DA connects tone source 205, which tone source may be arranged in any one of the well-known circuit configurations operable to provide special tones over a pair of lines, to port 6 of bridge A via enabled make contacts 8DA–1, and 8DA–2. Tone source 205 in this situation is arranged to provide originator disable tone to line L5 via now enabled make contacts 8DA–2 and 8DA–1 and amplifier A4 to port 6 of bridge A, through the bridge to port 5 and via the enabled make contacts 10CA5–13 and 10CA5–14, resistors 244 and 245, and through bridge input circuit BI–5 and over the transmit leads 5T1 and 5T2 of line L5.

At the conclusion of the 1-second timed interval, as noted above, relay 8AD releases and tone is no longer transmitted. It should be noted that during the time originator tone is being transmitted via bridge A to line L5, line L1 becomes connected to port 1 of that bridge due to the operation of the bridge connection relay 9CA1 in the manner discussed previously. Thus, a portion of the originator tone is transmitted over line L1 as well as over line L5. However, since originator disable tone has already been transmitted on line L1 (upon the calling station going off-hook in line L1) this tone has no effect on line L1 at this time.

Upon termination of the tone, lines L1 and L5 are both connected to respective ports of bridge A and thus are in two-way communication with each other. Accordingly, the calling station may transmit the three-digit code associated with the called station. This code is received from the calling station over leads 1R1 and 1R2 of line L1 and is retransmitted to line L5 via transformer T2, amplifier A2 and transformer T4 of bridge input circuit BI–1, resistors 262 and 263, enabled make contacts 9CA1–11 and 9CA1–12, port 1 of bridge A and through the bridge to port 5 and over the previously described path from port 5 to the transmission leads 5T1 and 5T2 of line L5. The called station, upon decoding the three-digit code, signals the subscriber thereat. Upon going off-hook the called station will be in direct communication with the calling station. Since originator disable tone has already been sent on line L5, the called station does not become an originating station on line L5 upon going off-hook.

2.10 DISCONNECTION OF ESTABLISHED CONNECTION

In the situation where the called station goes on-hook prior to the calling station going on-hook and the connection is the type of connection just described, i.e., a case 1, FIG. 16 connection, nothing happens. This follows since the called station has specifically not been designated as an originating station and only originating stations may change the connection. When the calling station in line L1, which station is the originating station, goes on-hook, disconnect tones are transmitted over line L1. These tones are received and decoded by receiver translator 201, FIG. 2, into a ground on lead ADT1 and a high on lead STL1. These tones are also transmitted at this time to the called line L5 via the still established bridge connection.

Figure 11:
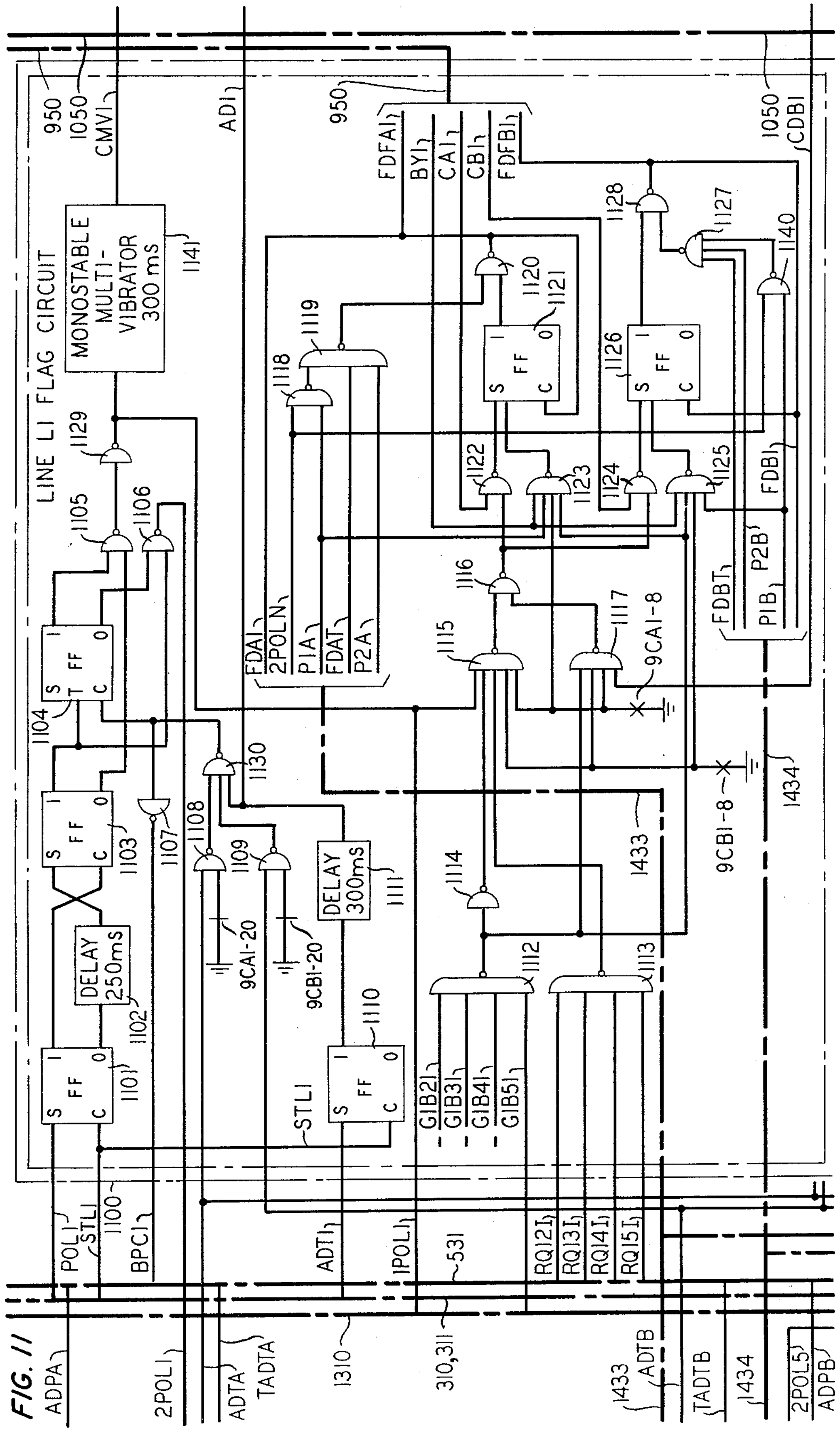

Turning now to FIG. 11, the 1110 flip-flop becomes set as a result of the translated ground and high on leads ADT1 and STL1, respectively. At the end of a 300-millisecond delay the output of timer 1111 goes low. This delay interval is for the purpose of insuring a valid disconnect tone. The low is extended via lead AD1 and cable 313 to FIG. 5 to reset flip-flop 502. In the case where the call is abandoned note that normally flip-flop 502 is reset by gate 508 and delay 505 as discussed above. At the same time the low is extended to gate 1130 the output of which gate thereby goes high resetting flip-flop 1104 if that flip-flop had been set. The high from gate 1130 is inverted by gate 1107 and is extended via lead BPC1 and cable 531 to FIG. 9 to reset busy-idle flip-flop 908 of line L1.

Since for proper operation of the circuitry at each station location, disconnect tone must be continuously received for a certain minimum time, the bridge separation cannot occur prior to this minimum. The circuitry for accomplishing this is shown in FIG. 14.

Figure 14:
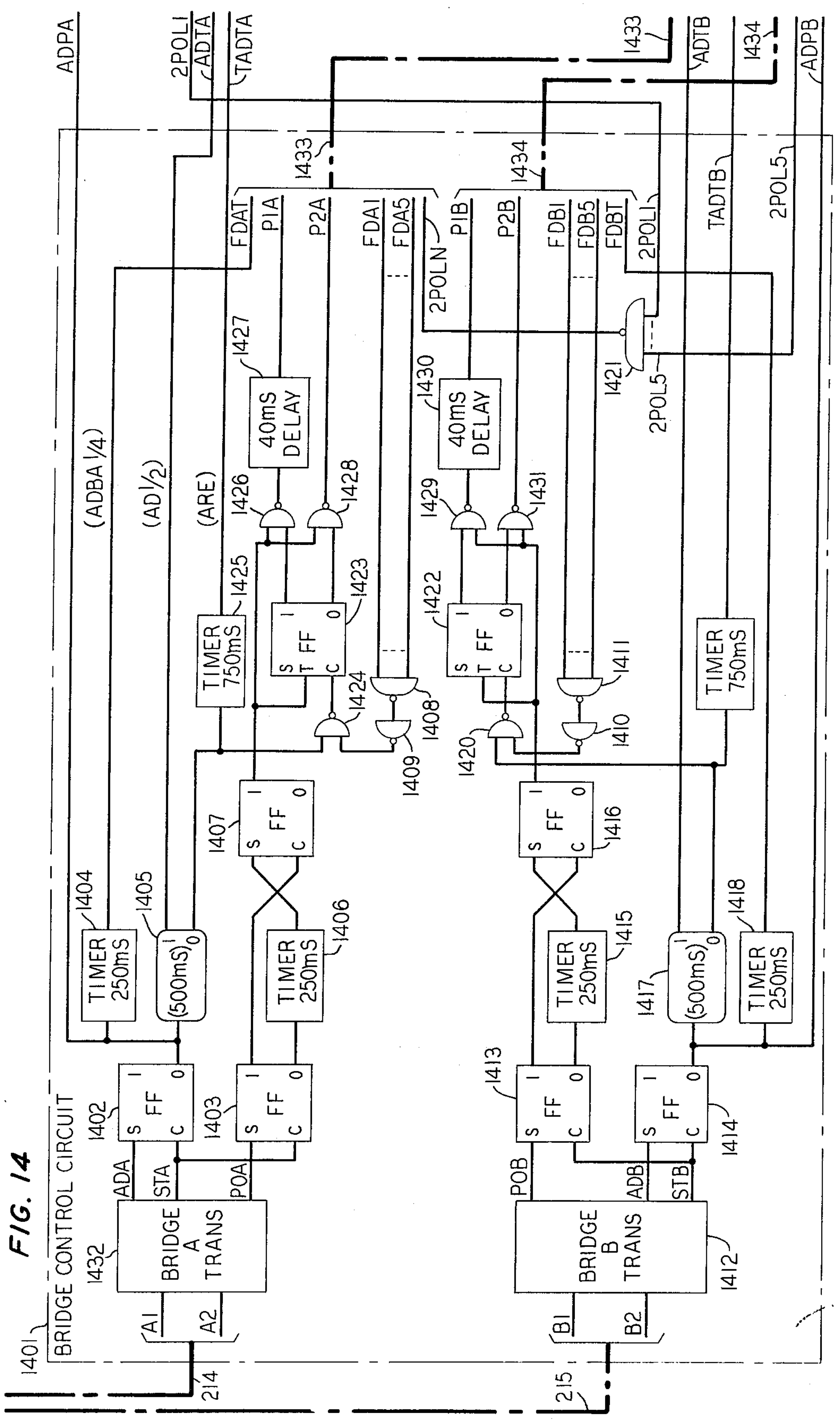
Figure 15:
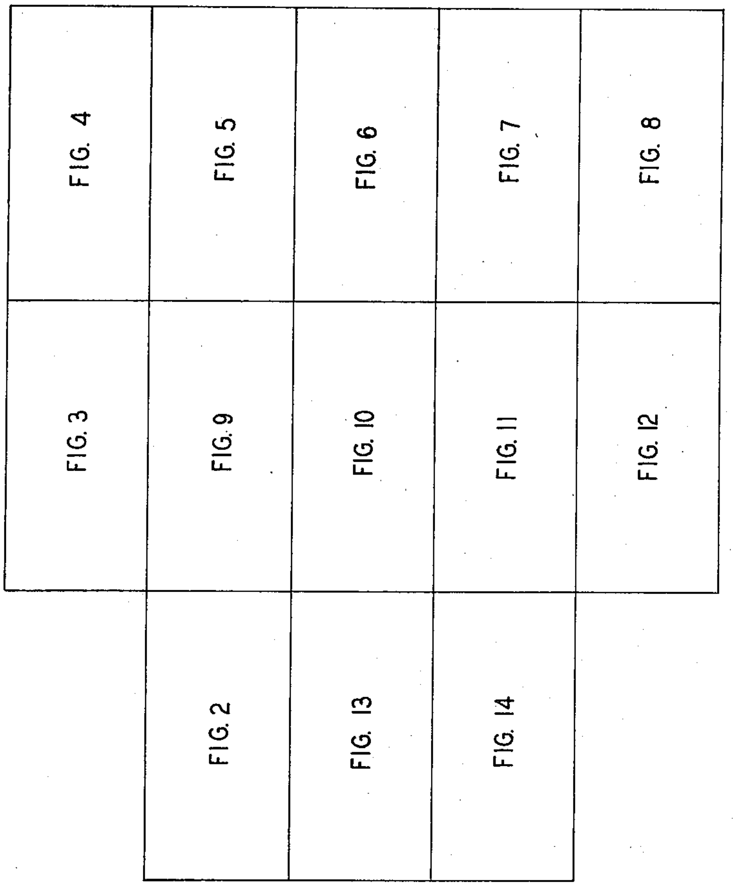
FIG. 15 shows the manner in which FIGS. 2 through 14 should be arranged.

Continuing in FIG. 14, upon detection of automatic disconnect tone via an obvious path from port 6 of bridge A and leads A1 and A2 of cable 214, bridge A, translator 1432, which translator is arranged in the manner described for translator 201 causes flip-flop 1402 to set. The "0" output lead of flip-flop 1402 causes timer 1405, which timer is operative as detailed in U.S. application, Ser. No. 779,512 of M. S. Lane, now U.S. Pat. No. 3,543,184 issued Nov. 24, 1970, to begin a delay interval. At the conclusion of the interval, which in this case is 500 milliseconds, the "1" output goes high while the "0" output goes low. The high output of timer 1405 is extended via lead ADTA to FIG. 12. Since relay 9CA5 is still operated, both leads of gate 1208 are high which causes the output of gate 1208 to go low. This low causes the output of gate 1230 to go high. This high is inverted by gate 1207 and the low from gate 1207 is extended via lead BPC5 and cable 531 to FIG. 10 to reset flip-flop 1008, the busy-idle flip-flop of line L5. The low output of timer 1405 is delayed by timer 1425 for an additional 750 milliseconds and then this low is extended via lead TADTA and cable 531 shown in FIG. 10 thereby resetting all of the bridge control relay flip-flops in all of the line connecting circuits. Accordingly, relays 10CA5 and 9CA1 now release thereby removing lines L1 and L5 from bridge A. At this point the entire network is in the condition it was in just prior to the interline call.

2.2 CALLED LINE BUSY

Let us assume at this point that a station on line L5 is communicating with a station on line L4 over bridge A. Also, let us assume that a station on line L1 desires to establish a connection to a station on line L5. This situation is case 6 shown in FIG. 16.

Accordingly, in a manner described previously the calling station on line L1 key pulses the three digits, #, 1, 5. Upon receipt of the three digits corresponding to line L1 calling line L5, a low is placed on lead U15 shown in FIG. 5. Accordingly, flip-flop 502 is set and the "1" output thereof goes high. Since it has been assumed that line L5 is busy, lead CDB5 is high from line L5 connecting circuit FIG. 10. The CDB5 lead is associated with the "1" output of the busy flip-flop 1008 which flip-flop is set because of the assumed busy condition of line L5.

Continuing now in FIG. 5, the high on lead CDB5 is extended to an input of gate 511. Another input of gate 511 is connected to the "1" output of flip-flop 502 which lead is also high. The other input of gate 511 is alternately going high and low from multivibrator 523. Accordingly, output lead BTR15 from gate 511 is also alternately going high and low at this time. Lead BTR15 is extended via cable 531 to line L1 connection circuit, FIG. 9. Accordingly, the output of gate 915 is alternately going high and low and thus relay 9BT begins to pulse. Concurrently therewith, as shown in FIG. 5, the inputs to gate 512 are also both high and therefore lead BT115 is low. Lead BT115 extends from FIG. 5 via cable 531 to line L1 connecting circuit, FIG. 9, and gate 917 to cause timer 918 to begin a 10-second interval. The output lead BTT1 of timer 918 remains high during this period.

As shown in FIG. 2, the pulsing of relay 9BT provides a pulsating ground via enabled make contact 9BT–1 to oscillator 202 which oscillator is arranged in any of the well-known circuit configurations operable to provide specific tones, such as busy tone, on a pair of leads. Accordingly, oscillator 202 provides busy tone under control of relay 9BT via amplifier A3 and transformer T1 to the transmit leads 1T1 and 1T2 of line L1. Accordingly, the calling subscriber on line L1 now receives busy tone as an indication that the called line L5 is busy.

2.3 OVERRIDE CONNECTION

The calling subscriber on line L1, upon receipt of busy tone, has 10 seconds to operate an override key if the subscriber desires to override the busy condition of line L5.

Upon operation of the override key at the calling station, dialing capability is removed therefrom and a special override signal in the form of a specific tone is transmitted over line L1 for a fixed period of time, such as for 1 second. When this tone is received by receiver translator 201 of bridge input circuit BI–1 a ground is supplied on lead POL1 and a high is supplied on lead STL1 from receiver translator 201 to cable 310 to FIG. 11 thereby setting flip-flop 1101 in line L1 flag circuit. Accordingly, flip-flop 1103 becomes set in a straightforward manner after a 250 millisecond delay to ensure the validity of the signal. Since the T input of J–K flip-flop 1104 has just made a transition from low to high that flip-flop sets at this point. When the override tone ceases, flip-flop 1103 will be reset. Thus both inputs to gate 1105 are high which causes the output of gate 1105 to go low. This signal is inverted by gate 1129 which causes multivibrator 1141 to operate. The multivibrator then extends a 300 ms low pulse on lead CMV1 of cable 313 to FIG. 5, causing the output of gate 506 to go high.

Continuing in FIG. 5, the output of gate 506 thus goes high and since both inputs to gate 503 are now high (flip-flop 502 set when line L1 called busy line L5) the output of gate 504 goes high. Since line L5 is currently on bridge A the bridge A connection relay 10CA5 associated with line L5 is operated. Thus a high is on an input lead to gate 507 via enabled break contact 10CA5-1. It is this high which steers the connection to bridge A as opposed to bridge B, which bridge is controlled via gate 509.

Since neither the bridge connecting relay 9CA1 associated with line L1, bridge A nor the bridge connecting relay 9CB1 associated with line L1, bridge B is operated, highs are provided on both inputs of gate 521 via enabled make contacts 9CA1-3 and 9CB1-3. The output of gate 521 is therefore low and the output of gate 522 is high. Accordingly, at this point all three input leads of gate 507 are high and the output lead of gate 507 goes low. This low is extended via lead A1-(5) and cable 531 to FIG. 9 causing the output of gate 902 to go high thereby setting flip-flop 905 and causing line L1 bridge A connecting relay 9CA1 to operate. Line L1 busy status flip-flop 908 is also set at this time.

Accordingly, as shown on FIG. 2, line L1 via bridge input circuit BI-1 is connected to port 1 of bridge A via now enabled make contacts 9CA1-11, 9CA1-12, 9CA1-13 and 9CA1-14. Thus, at this point the calling subscriber on line L1 is in communication via bridge A with the previously established connection on bridge A between lines L5 and L4 which lines are currently connected to ports 5 and 4, respectively, of bridge A.

Since as has been discussed previously, line L1 does not have dialing capability at this point, line L1 may not interfere with the connection on bridge A and thus can communicate only with the parties previously communicating on bridge A. If the station on line L5 to which the calling station on line L1 intended to direct the call does not happen to be a party to the conference on bridge A, the subscriber on line L1 must convince the subscribers currently communicating on bridge A that the connection to the desired station on line L5 is of such importance that the previously communicating parties must relinquish their connection. Under such a situation, the connection just described would be terminated in a manner to be detailed hereinafter, and a new interline connection established from line L1 to line L5 in the manner discussed previously.

In the event the calling subscriber on line L1 did not desire to establish an override call or did not operate the override key within 10 seconds after receipt of busy tone the system will disconnect. As shown in FIG. 9, timer 918 supplies a low on lead BTT1 after 10 seconds thereby resetting flip-flop 502, FIG. 5, thus preventing line L1 from overriding the connection and returning the interline control circuit to its idle condition.

2.4 OPERATION OF FLAG LOGIC

Since line L1 is the overriding line, care must be taken to ensure that when line L1 returns on-hook the automatic disconnect tone which is transmitted on line L1 at that time is not extended to lines L4 and L5 via the common bridge A connection. Thus, it is important to disconnect line L1 from bridge A before the length of automatic disconnect tone received by lines L4 and L5 is sufficient to disconnect the stations on those lines. This function is accomplished by marking one of the lines upon establishment of the connection under control of flag circuitry 1100, and in particular, under control of the flag circuitry associated with lines L1 and L5 in the following manner.

Figure 13:
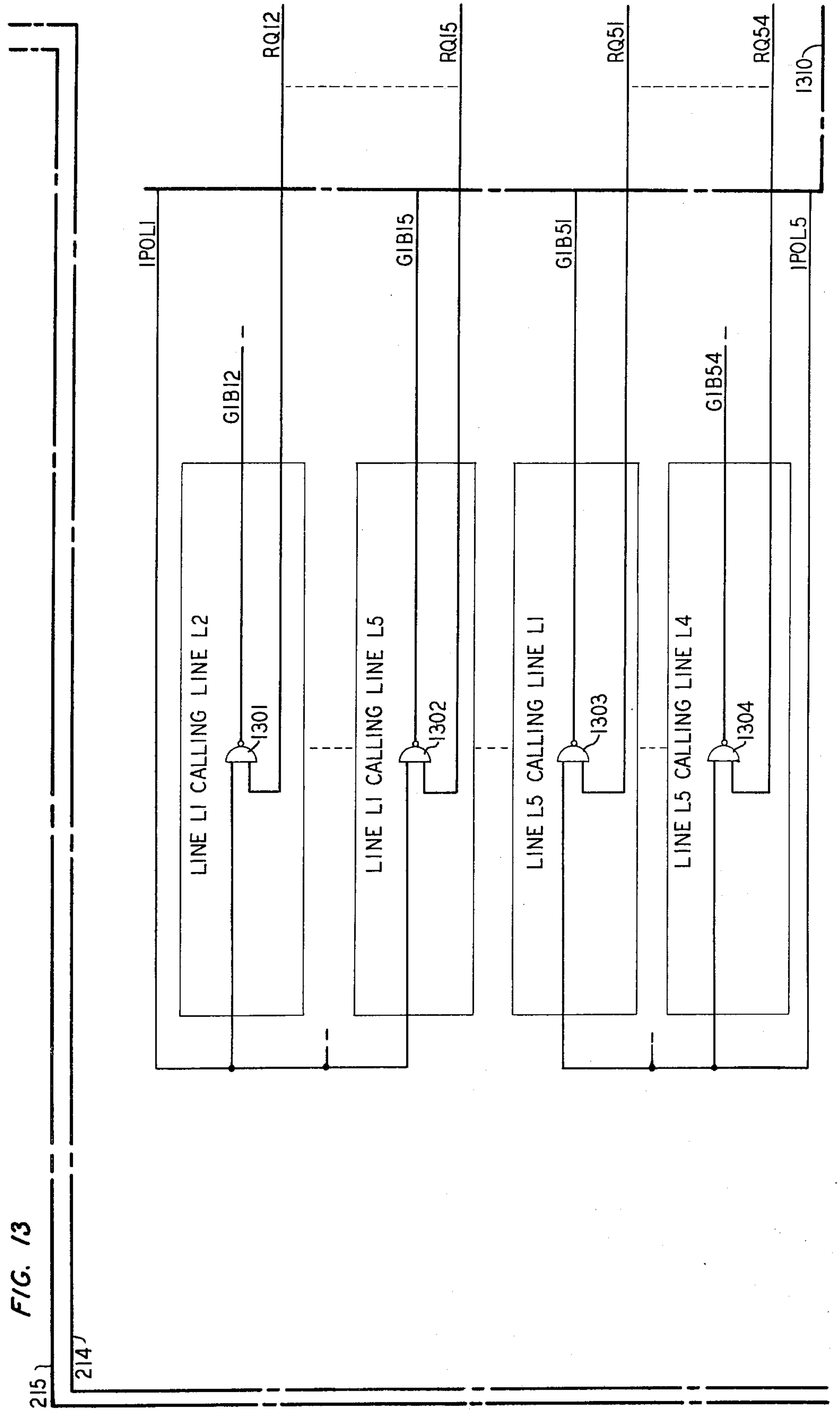

Turning now to FIG. 11, it will be recalled that upon receipt of privacy override tone the output of gate 1129 when high thereby providing a high to one input of gate 1115 which high was also extended via lead 1POL1 and cable 1310 to FIG. 13 to the input of gate 1302. The other input of gate 1302 has a high thereon from lead RQ15 and cable 531 from FIG. 5 which lead is high at this point from the set condition of flip-flop 502. Thus the output lead G1B15 from gate 1302 is low.

Figure 12:
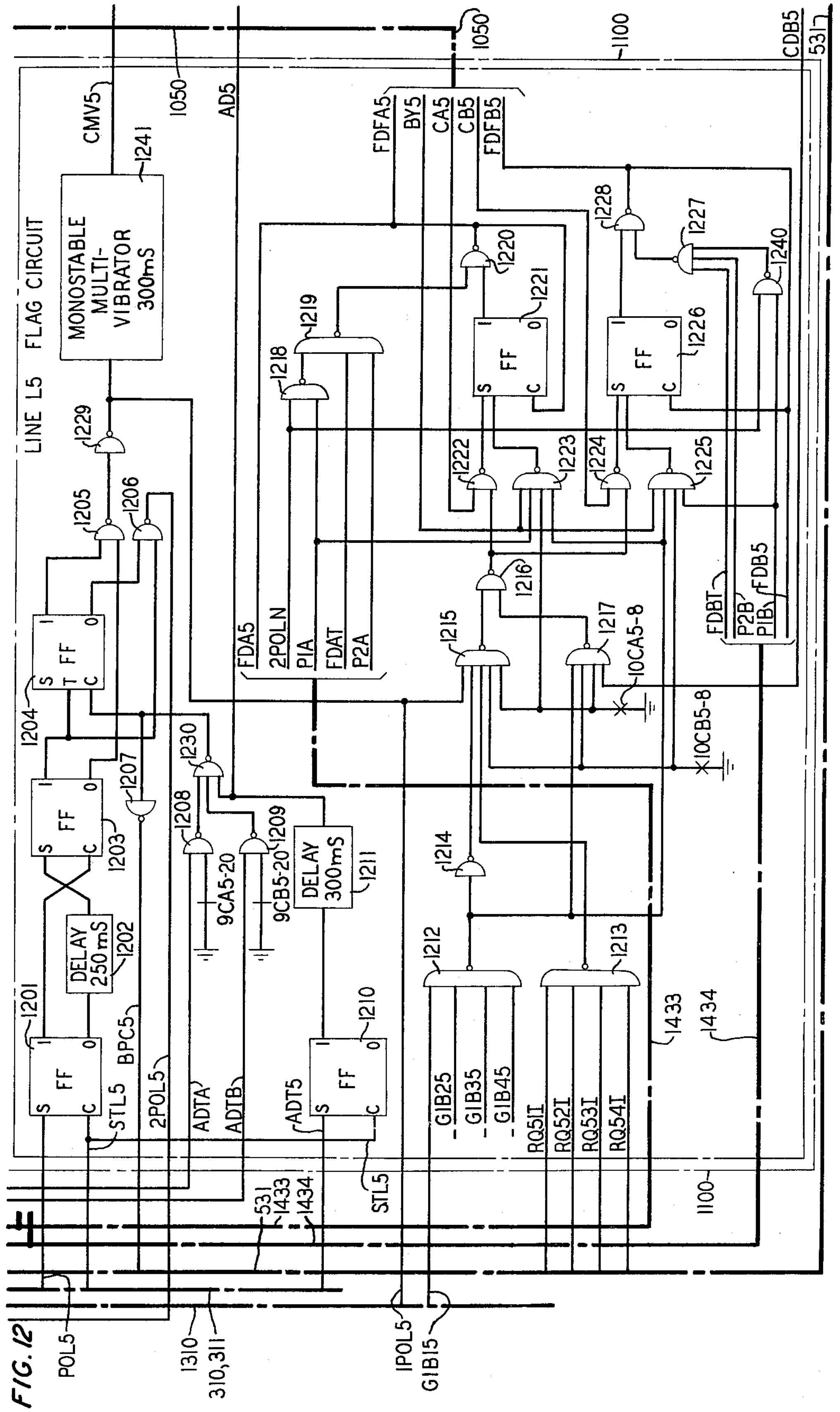

Lead G1B15 is extended via cable 1310 to FIG. 12 and the flag circuitry associated with line L5. Thus the output of gate 1212 goes high and the output of gate 1214 goes low thereby maintaining the output of gate 1215 high. Since line L5 bridge A connecting relay 10CA5 is operated, ground is on one input of gate 1217 via enabled make contact 10CA5-8 and thus the output of gate 1217 is high. Therefore, both inputs to gate 1216 are high thus maintaining the output of gate 1222 high. The output of gate 1223 is also maintained high at this time via a low from enabled make contact 10CA5-8. Flip-flop 1221 which is the flag flip-flop associated with line L5 bridge A thus remains reset when the bridge connection to line L1 is established.

Turning now to FIGS. 11 and 13, a review of the flag logic associated with line L1 shows that when privacy override tone is first received all of the inputs to gate 1112 are high. This follows since the only RQ-lead which is high is the RQ15 lead from line L1 calling line L5 connection circuit, FIG. 5. Since lead RQ15I from FIG. 5, which lead is the inverse of lead RQ15, is thus low, the output of gate 1113 is high. Since line L1 bridge A connecting relay 9CA1 and line L1 bridge B connecting relay 9CB1 are normal during receipt of override tone, all inputs of gate 1115 are high therefore causing the output of gate 1116 to be high. Since input lead CA1 to gate 1122 goes high under control of gate 902 of FIG. 9 which condition occurs at the completion of the override tone just prior to the enabling of line L1 bridge A connecting relay 9CA1 both inputs to gate 1122 are high and line L1 flag flip-flop 1121 thereby sets.

2.5 DISCONNECTION OF OVERRIDE CONNECTION

At the termination of the interline override call when the override key is released at the calling station, privacy override tone is again transmitted over line L1 and received by receiver translator 201. This tone is also transmitted through bridge input circuit BI-1 via transformer T2, amplifier A2, transformer T4 and via bridge A, port 1 to port 6 and cable 214 to FIG. 14 and translated by bridge A translator 1432 thereby setting flip-flop 1403. Flip-flop 1407 then sets after a delay of 250 milliseconds, which delay ensures the validity of the signal. Flip-flop 1423 sets at this time because of the low to high transition on its T input. Accordingly, both inputs to gate 1426 are now high thereby causing its output to go low. This low is inverted by delay timer 1427, which timer is arranged in any one of the well-known circuit configurations to delay only high going signals. The high on lead P1A is extended via cable 1433 to gate 1118, shown in FIG. 11.

Continuing in FIG. 11, receipt of override tone also causes flip-flops 1101 and 1103 to set in the manner set forth above. Thus flip-flop 1104, which flip-flop was set as a result of the first received override tone on line L1, now resets. Thus, during the period in which override tone is being received, both inputs to gate 1106 are high and lead 2POL1 to FIG. 14 is low causing lead 2POLN to be high. Lead 2POLN is extended back to FIG. 11 via cable 1433 to gate 1118. Since override tone has been received on the bridge once, as evidenced by a high on lead P1A of gate 1118, and has been received twice by line L1 flag circuit 1100, as evidenced by a high on lead 2POLN of gate 1118, the output of gate 1118 now goes low. The output of gate 1119 then goes high. Since both inputs of gate 1120 are now high because of the set condition of line L1 flag flip-flop 1121, lead FDFA1 now goes low. This low is extended via cable 950 to FIG. 9 thereby resetting flip-flop 905 and line L1 bridge A connecting relay 9CA1. The FDFA1 lead also resets flap flip-flop 1121. Line L1 is therefore disconnected from bridge A. However, since only line L1 has been flagged by the operation of the flag flip-flop associated therewith, only line L1 is removed from the bridge at this time and lines L4 and L5 remain interconnected. Accordingly, at this point the connection circuit and the lines are in the same condition as they were in just prior to the override call from line L1.

Note that if the overriding line went on-hook before releasing the override key, automatic disconnect tone will be sent out by L1. This will be received by bridge A receiver and translator 1432. This sets flip-flop 1402. After a 250 milliseconds verification interval (timer 1404) lead FDAT goes low. This low is extended via cable 1433 to gate 1119 in FIG. 11. This causes gate 1119 to go high and since flip-flop 1121 is set gate 1120 goes low and the L1 bridge connecting relay, 9CA1, is released as discussed above. The automatic disconnect tone is also received by receiver-translator 201. The ADT1 output is extended via cable 310 to the set lead of flip-flop 1110 in FIG. 11. After a 300 millisecond verification interval flip-flop 1104 is reset through gate 1130 thus returning line L1 to the idle state. Automatic disconnect tone may now be transmitted on line L1 without interfering with the previously established connections on lines L5 and L4.

Turning now to FIG. 14, lead FDA1 goes low from flag circuit 1100 in the manner just discussed thereby resetting flip-flop 1423 even though override tone has only been received by the common bridge circuitry once. Thus the bridge connection circuitry is also restored to its condition just prior to the override connection and is immediately available to handle a second override connection from any other line to the busy bridge.

It is important to note that two factors are utilized to control the disconnection of lines from a bridge. The first factor is the status of the various lines at the initial establishment of the interline override connection. This status is determined by each circuit's busy-idle status in conjunction with that circuit's bridge connection status and is marked accordingly by the proper flag circuit. The second factor is the pattern of the received privacy override tones. Thus advantage is taken of the fact that whenever an override connection is to be established two bursts of override tones are transmitted over the overriding line; one burst at the start of the connection and the second burst at the conclusion of the connection. Accordingly, by associating decoding circuitry with each line and with each bridge it is possible to keep account of prior tone transmissions. This follows because when tone is transmitted on a line which is not connected to a bridge, the tone is received only by the line decoder. When the line is connected to a bridge, the tone is received by the line decoder as well as the bridge decoder. Thus by determining the exact number of times tone is received on the various lines and bridges and by comparing this determination with prior known status determinations marked by the flag circuitry, the proper disconnection of lines is maintained.

2.6 OVERRIDE CONNECTION WHEN BOTH BRIDGES BUSY

Assume now that lines L1 and L2 are involved in a connection on bridge A while lines L5 and L4 are busy on a connection on bridge B. Also, assume at this point that line L5 desires to communicate also with line L1. This is case 3, FIG. 16.

Figure 6:
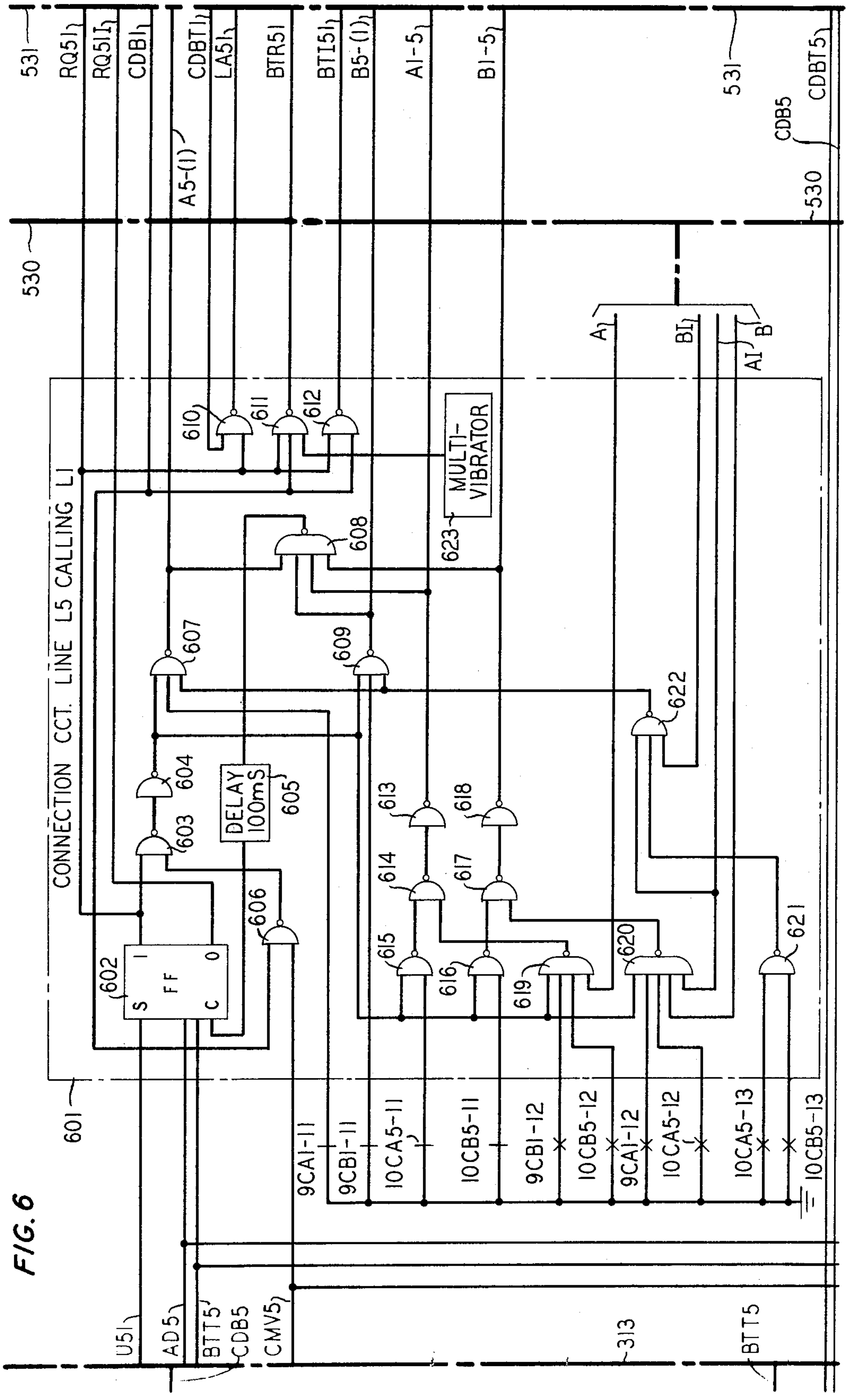
Figure 7:
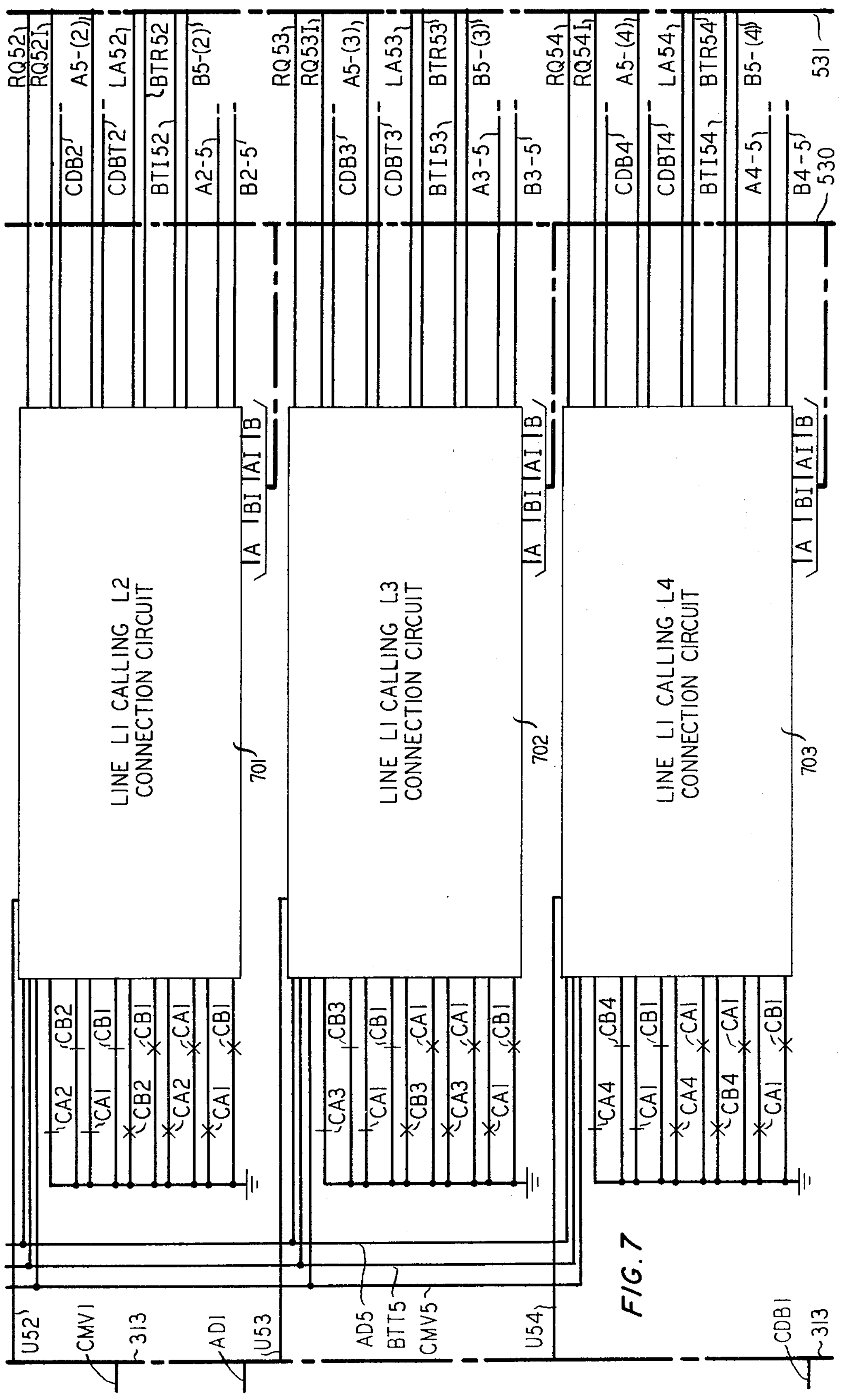

Accordingly, in the manner set forth previously, a ground is extended to lead U51 of FIG. 6 thereby setting flip-flop 602. Since line L1 is assumed to be busy, busy tone is returned to line L5. The subscriber on line L5 thereupon enables the privacy override key and privacy override tone is transmitted from line L5 and, as shown in FIG. 2, through bridge input circuit BI–5 and via bridge B, port 5, to the interconnected line L4 via port 4 (not shown). The override tone is also transmitted via bridge B and port 6 via cable 215 to FIG. 14 and via bridge B translator 1412 to set flip-flops 1413 and 1416 in a straightforward manner.

While the tone is being received, flip-flop 1422 sets after 250 milliseconds as timed by timer 1415 and thus the output of gate 1429 goes low and delay gate 1430 goes high thus making the P1B lead high. This high is transmitted via lead P1B and cable 1434 to FIG. 11 to the input of gate 1125. Since line L1 is busy, lead BY1 from FIG. 9 is also high at this time. Since line L1 bridge B connecting relay 9CB1 is idle, a high via released make contact 9CB1–8 is provided on an input lead of gate 1125. Also, at this time, since line L5 is overriding line L1, lead 1POL5 (first burst of override tone on line L5), FIG. 12, is high. This high is extended via cable 1310 to FIG. 13 thereby causing lead G1B51 to go low which low is extended via cable 1310 to FIG. 11 making the output of gate 1112 high. This high is extended to an input lead of gate 1125. Since all input leads of gate 1125 are now high, line L1 bridge B flag flip-flop 1126 becomes set. The setting of this flip-flop as will be seen from that which is contained hereinafter, marks line L1 bridge B as the connection which must be removed subsequently when second override tone is received. Turning now to FIG. 12, since line L5 is the overriding line, lead CMV5 goes low for 300 milliseconds under control of monostable multivibrator 1241. This low is extended via cable 313 to FIG. 6 thereby causing the output gate 606 to go high. Thus, the output of gate 604 goes high. It will be recalled at this point that line L5 is busy on bridge B and thus bridge connecting relay 10CB5 is operated. It will also be recalled that line L1 is busy on bridge A and therefore bridge A connecting relay 9CA1 is also operated at this time. Since bridges A and B are both busy, leads AI and BI of cable 531 from FIG. 8 are both high. As shown in the line L5 calling line L1 connection circuit, it is the combination of all of these factors that shows the connection so that line L1 is connected to line L5.

Continuing in FIG. 6, since both inputs of gate 616 are now high its output is low, thus the output of gate 618 is also low. This 100 milliseconds low pulse (as timed by delay timer 605) is extended via lead B1–5 and cable 531 to FIG. 9 thereby setting flip-flop 907 and enabling line L1 bridge B connection relay 9CB1. Accordingly, as shown in FIG. 2, line L1 is connected to bridge B via now enabled make contacts 9CB1–11, 9CB1–12, 9CB1–13, 9CB1–14. Communication may now take place between lines L1, L2, L4 and L5. However, it should be noted that communications which originate on bridge B will be received only by line L1 and not by line L2. This follows since such communications would be placed on the output pair of leads of port 1 of bridge A, as shown in FIG. 2.

2.7 DISCONNECTION OF OVERRIDE CONNECTION

When the overriding subscriber on line L5 desires to release the connection to line L1, the privacy override key is released. Thus, a second burst of privacy override tone is transmitted throughout the system. As discussed above, this tone is translated by bridge B, translator 1412, FIG. 14, thereby operating flip-flops 1413 and 1416. Flip-flop 1422 will reset after 250 milliseconds of privacy override tone are received. (The 250 milliseconds interval is timed by timer 1415.) As soon as flip-flop 1422 resets the output of gate 1431 goes on. This follows since the "1" output of flip-flop 1416 is still high because privacy override tone is still being received. Thus lead P2B goes low.

It should be noted that privacy override tone is not received by bridge A, translator 1402 for the same reason, as discussed above, that transmission originating on lines L4 or L5 (bridge B) is not received by line L2.

Continuing in FIG. 14, the low on lead P2B is extended via cable 1434 to FIG. 11 to gate 1127 associated with line L1 flag circuit. This low causes the output of gate 1127 to go high. Since line L1 flag flip-flop 1126 is set, both inputs of gate 1128 are high and thus lead FDFB1 is low. This low is extended via cable 950 to FIG. 9 to reset flip-flop 907 and also resets flag flip-flop 1126. Accordingly, line L1 bridge B connection relay 9CB1 is released and the two bridges are again separated. Since only the flag flip-flop associated with line L1 was set when override tone was first received, the other previously established connections on each bridge are maintained in the condition they were in just prior to the initiation of the privacy override connection.

2.8 OVERRIDE ON BUSY CALLED LINE

In the situation, such as case 7, FIG. 16, where a calling line, such as line L5 attempts to establish a connection to a called line, such as line L1, which called line is busy on a connection not involving a bridge, care must be taken to protect the called line from interference from the calling line. It will be noted that this situation is different from case 3, FIG. 16, discussed previously and case 5, FIG. 16 since the called line L1 is not on a bridge. Also note that it is assumed that bridge A is busy at this point. The purpose of this assumption is to illustrate the bridge selection circuitry.

Turning now to FIG. 6, flip-flop 602 sets upon the receipt of the interline code # 51 from line L5 in the manner discussed above. The setting of flip-flop 602 causes the line L5 calling line L1 connection circuit 601 to interrogate the busy idle flip-flop of line L1. This is accomplished via leads CDB1 and CDBT1 of cable 531 to FIG. 9.

Figure 3:
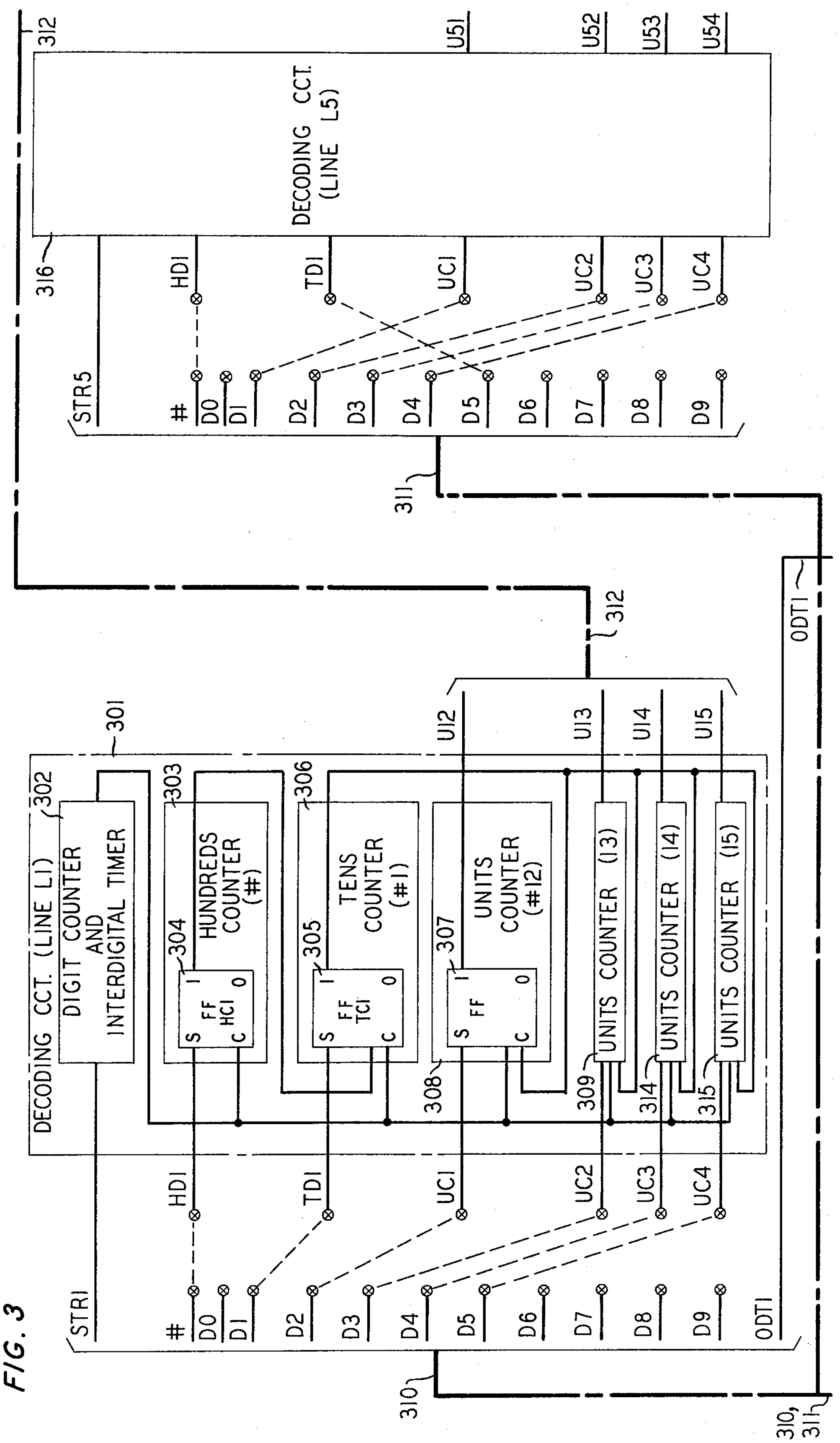
Figure 4:
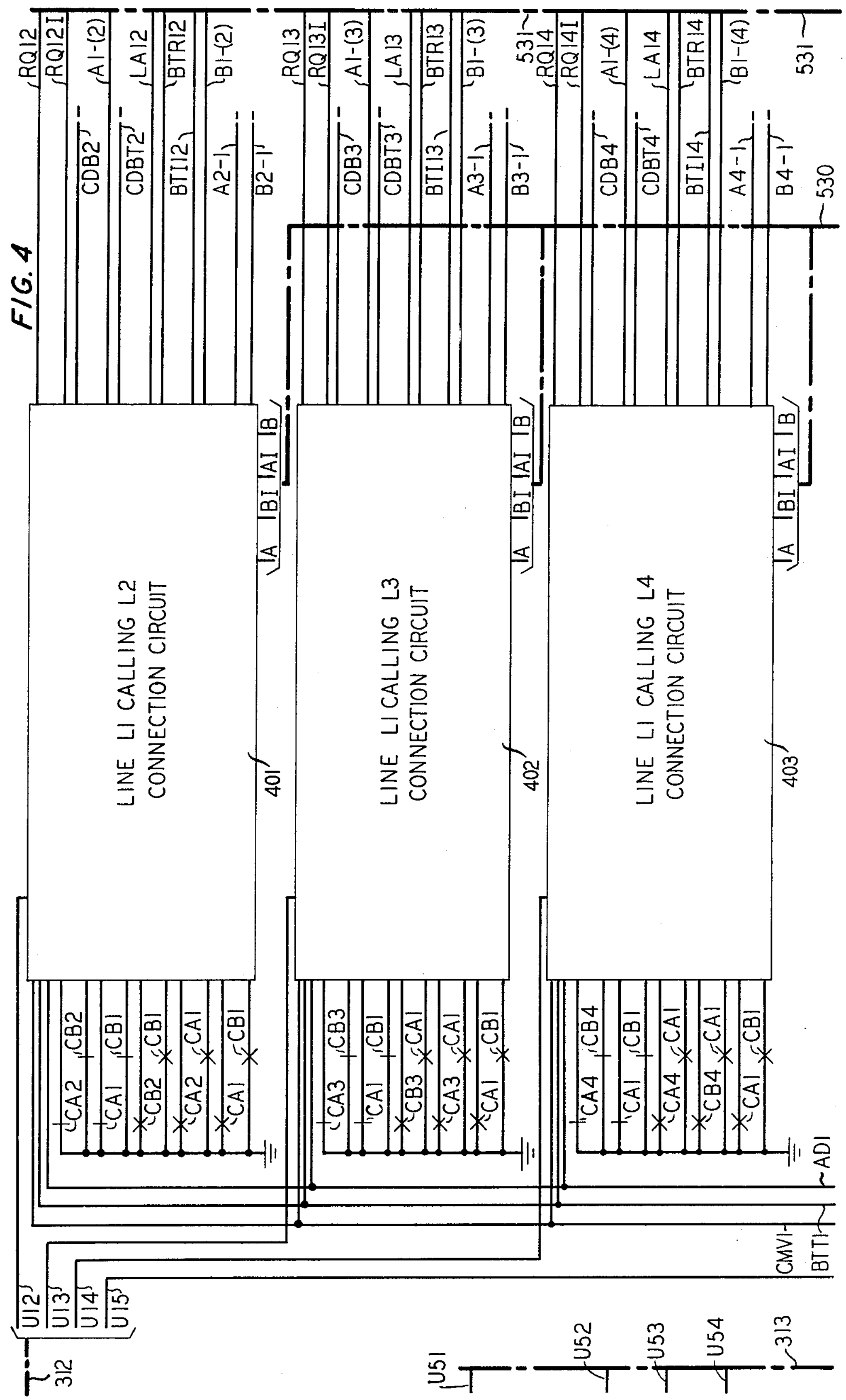

Continuing in FIG. 9, the busy-idle flip-flop 908 associated with line L1 is set at this time because line L1 has been assumed to be busy. This follows from the fact that lead ODT1 via cable 310, FIGS. 2 and 3, are arranged to set flip-flop 908 under control of receiver translator 201. Receiver translator 201 in turn becomes enabled in response to originator disable tone transmitted over the four-wire line facility from the first station off-hook in line L1.

Returning to FIG. 6, since leads CDB1 and CDBT1 are high, busy tone is returned to line L5 in the manner set forth above.

When privacy override tone is received from line L5 the output of gate 606 goes high in the manner discussed. Thus the output of gate 604 also goes high. Since it has been assumed that bridge A is busy, lead A from cable 530 and FIG. 8, is low while lead AI is high. Since bridge B is idle, lead B via cable 530 and FIG. 8 is high while lead BI is low. Accordingly, all inputs to gate 620 are high thus causing the output of gate 618 to go low. This low is extended via lead B1–5 and cable 531 to FIG. 9 thereby operating line L1 bridge B connecting relay 9CB1.

continuing in FIG. 6, the bridge selection circuitry functions in the following manner. When relay 9CB1 is operated, a high is extended to an input lead of gate 609. Since lead BI is low, the output of gate 622 is high and thus all inputs to gate 609 are high. Accordingly, a low is extended via lead B5–(1) and cable 531 to FIG. 10 to operate line L5 bridge B connecting relay 10CB5.

Again returning to FIG. 6, the situation could exist that line L5 is currently active on an interconnection involving bridge B. Thus lead B would be low and gate 620 could not have caused the connection described above. However, in such a situation a high would be on an input to gate 616 via enabled make contact 10CB5–11 and thus gate 618 would have operated as discussed.

As mentioned above, line L1 must be flagged to ensure proper disconnection. This is accomplished in the following manner, as shown in FIGS. 11 and 12. When override tone is first transmitted on line L5, the output of gate 1229 goes high. Thus lead 1POL5 is high, which high is extended via cable 1310 to FIG. 13. Since lead RQ51 (line L5 calling line L1) is high, lead G1B51 is low. This low is extended via cable 1310 to FIG. 11 thereby causing the output of gate 1112 to go high. Accordingly, all inputs to gate 1123 are high thereby setting line L1 flag flip-flop 1121.

In the situation where line L5 is not connected to a bridge prior to the interline call, upon receipt of privacy override tone, all inputs to gate 1215 are high and thus line L5 flag flip-flop is also set. If line L5 were on bridge B at that time a low would be on one input of gate 1215 via enabled make contact 10CB–8 and thus line L5 flag flip-flop 1221 would remain reset.

Since it is the set condition of the respective line flag flip-flops that controls the release of the line from the bridge it will be noted that only line L1 would be released upon subsequent receipt of a second burst of override tone if line L5 had been on the bridge prior to the override connection. Accordingly, if line L5 had not been involved on an interline call prior to the override call then both lines L1 and L5 would be released from bridge B upon receipt of a second burst of override tone. Thus the system would be returned to its condition just prior to the connection.

2.9 CONCLUSION

While the equipment of the invention has been shown in a particular embodiment wherein a number of independent lines of a private line selective communicating system have been interconnected in response to frequencies transmitted over the lines, it is understood that such an embodiment is intended only to be illustrative of the present invention and numerous other arrangements may be devised by those skilled in the art without departing from the spirit and scope of the invention.

What is claimed is:

1. A control circuit for establishing communication connections between individual lines of a multiline selective signaling system wherein each of said lines has associated therewith at least one station and wherein the first station going off-hook in each of said lines is designated as an originating station, each said originating station being given exclusive signaling capability, said control circuit comprising

- means for determining the busy-idle status of any of said lines,
- means for directing a connection from a calling one of said stations in a calling one of said lines to a called one of said lines, and
- means responsive to a connection directed to a detected idle called line for transmitting a first signal to said called line prior to enabling communication between said calling and said called lines so as to inhibit a first off-hook called station associated with said called line from being designated as an originating station.

2. The invention set forth in claim 1 further comprising

- means for establishing a timed interval,
- means responsive to a connection directed to a determined busy called line for starting said timed interval and for returning busy signals to said calling station associated with said calling line.

3. The invention set forth in claim 2 wherein certain of said stations are equipped for priority signaling,

- means in said control circuit operative in response to a priority signal from a station to which busy signals are being returned for inhibiting said busy signals and for enabling communication from said calling line to said called line.

4. The invention set forth in claim 3 further comprising means responsive to the termination of said timed interval for inhibiting said busy signals to said calling station.

5. The invention set forth in claim 2 further comprising means responsive to the termination of a connection from a calling line to a detected idle line for transmitting disconnect signals to said calling and said called lines.

6. The invention set forth in claim 5 further comprising means responsive to the termination of a connection from a calling line to a detected busy line for inhibiting the transmission of said disconnect signals to said called line while still transmitting said disconnect signals over said calling line.

7. The invention set forth in claim 5 further comprising means responsive to the termination of a connection from a calling busy line to a detected busy line for inhibiting the transmission of said disconnect signals to said calling and said called lines.

8. In a multiline selective signaling system wherein a first station off-hook in each line is given exclusive signaling control of that line, a circuit for enabling connections between lines comprising

- a first multiport bridge,
- first connecting means operable for connecting calling and called lines to individual ones of said ports of said first bridge,
- means responsive to a connection directed from a calling one of said lines to a called one of said lines for preventing a first off-hook station in said called line from gaining signaling control of said called line, and
- means concurrently operable with said preventing means for enabling said first connecting means so as to connect said calling and said called lines to individual ports of said first bridge.

9. The invention set forth in claim 8 further comprising

- means for detecting the busy-idle status of each of said lines,
- means for determining which ones of said lines are connected to said bridge, and
- means concurrently operable with said preventing means and operable in conjunction with said busy-idle status detecting means for flagging in a first manner any connection directed to a determined idle line and for flagging in a second manner any connection directed to a determined busy line.

10. The invention set forth in claim 9 wherein said preventing means includes

- means for transmitting a first signal over any said line for removing signaling capability from all stations connected to said first signaled line, and
- means for transmitting a second signal over any said line for reestablishing signaling capability to a subsequently first off-hook station in said second signaled line.

11. The invention set forth in claim 10 further comprising means operative in response to the termination of a connection flagged in said first manner for enabling said second signal transmitting means over said called line, and means operable in conjunction with said last-mentioned means for removing said called line from said bridge.

12. The invention set forth in claim 11 further comprising means operative in response to the termination of a connection flagged in said first manner for delaying the enabling of said removing means so as to allow a said second signal to be transmitted over said called line for a certain fixed period.

13. The invention set forth in claim 11 further comprising means operative in response to the termination of a connection involving a connection flagged in said second manner for inhibiting the enabling of said second signal transmitting means over said removed line, and means operable in conjunction with said last-mentioned means for removing said called line from said bridge.

14. The invention set forth in claim 8 further comprising a second multiport bridge, second connecting means operable for connecting calling and called lines to individual ones of said ports of said second bridge, means for monitoring the busy-idle status of each of said bridges, and means concurrently operable with said preventing means for inhibiting the operation of said first connecting means when said first bridge is monitored busy and for thereupon enabling said second detecting means if said second bridge is monitored idle.

15. The invention set forth in claim 14 further comprising means for detecting the busy-idle status of each of said lines, means for determining which ones of said lines are connected to which ones of said bridges, means for flagging in a first manner any connection directed from a line connected to either of said bridges to a line detected idle, means for flagging in a second manner any connection directed from a previously idle line to a line connected to either one of said bridges, and means for flagging in a third manner any connection directed from a line connected to either of said bridges to a line connected to the other of said bridges.

16. The invention set forth in claim 15 wherein said preventing means includes means for transmitting a first signal over any said line for removing said signaling control capability from all stations connected to said signaled line, and means for transmitting a second signal over any said line for regaining signaling control capability to a first station off-hook in said second signaled line.

17. The invention set forth in claim 16 further comprising means responsive to the termination of a connection flagged in said first manner for enabling said second signal transmission means exclusively over said detected idle line, and means responsive to the termination of a connection flagged in said second manner for enabling said second signal transmission means exclusively over said previously idle line, and means responsive to the termination of a connection flagged in said third manner for inhibiting the enabling of said second signal transmission means.

18. In a multiline selective signaling system wherein each of the lines has associated therewith a plurality of stations and wherein the first station going of-hook in each of the lines is designated as an originating station, each said originating station being given exclusive signaling capability, the combination comprising transmission bridge means for interconnecting two of the lines, means responsive to a code from a calling station on one of the lines for connecting said one line and another line identified by said code to said transmission bridge means, and means for transmitting a signal over said another line to prevent the called station on said another line from becoming an originating station upon being the first station in said another line to go off-hook.

* * * * *

UNITED STATES PATENT OFFICE
CERTIFICATE OF CORRECTION

Patent No. 3,691,308 Dated September 12, 1972

Inventor(s) Ronald Joseph Angner and Anthony Koscinski

It is certified that error appears in the above-identified patent and that said Letters Patent are hereby corrected as shown below:

Abstract, line 13, after "the" and before "interference" insert --controlling station in the calling line in order to prevent--.

Column 3, line 10, change "stations" to --station--.

Column 4, line 52, change "100" to --1.00--.

Column 5, line 62, change "the" to --The--.

Column 10, line 63, change "2.10" to --2.1--.

Column 15, line 26, change "flap" to --flag--.

Column 18, line 45, change "continuing" to --Continuing--.

Column 19, line 9, change "10CB-8" to --10CB5-8--.

Column 22, line 19, delete "and".

Signed and sealed this 6th day of March 1973.

(SEAL)
Attest:

EDWARD M. FLETCHER, JR.
Attesting Officer

ROBERT GOTTSCHALK
Commissioner of Patents

UNITED STATES PATENT AND TRADEMARK OFFICE
CERTIFICATE OF CORRECTION

PATENT NO. : 3,691,308

DATED : September 12, 1972

INVENTOR(S) : Ronald Joseph Angner and Anthony Koscinski

It is certified that error appears in the above-identified patent and that said Letters Patent are hereby corrected as shown below:

Column 11, line 46, change "9CA5" to --10CA5--.
FIG. 12, relay contact "9CA5-20" to --10CA5-20--;
FIG. 12, relay contact "9CB5-20" to --10CB5-20--.

Signed and Sealed this

*Twenty-second* Day of *May 1979*

[SEAL]

*Attest:*

RUTH C. MASON
*Attesting Officer*

DONALD W. BANNER
*Commissioner of Patents and Trademarks*